United States Patent
Larson et al.

(10) Patent No.: US 6,465,076 B2
(45) Date of Patent: *Oct. 15, 2002

(54) ABRASIVE ARTICLE WITH SEAMLESS BACKING

(75) Inventors: Eric G. Larson, Lake Elmo; Steven J. Keipert, Oakdale; Alan R. Kirk, Cottage Grove, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,627

(22) Filed: Sep. 15, 1998

(65) Prior Publication Data

US 2002/0098323 A1 Jul. 25, 2002

(51) Int. Cl.[7] .............. B24D 11/02; B32B 5/16
(52) U.S. Cl. ............ 428/143; 428/149; 428/423.1; 51/295; 51/297; 442/63; 442/164; 442/167
(58) Field of Search ............... 428/143, 149, 428/423.1; 51/295, 297; 442/63, 164, 167

(56) References Cited

U.S. PATENT DOCUMENTS

| | | | |
|---|---|---|---|
| 2,032,356 A | 3/1936 | Ellis | 51/278 |
| 2,404,207 A | 7/1946 | Ball | 51/188 |
| 2,590,697 A | 3/1952 | Grove | 51/297 |
| 2,682,733 A | 7/1954 | Buckner | 51/188 |
| 2,743,559 A | 5/1956 | Ball et al. | 51/188 |
| 3,276,852 A | 10/1966 | Lemelson | 51/298 |
| 4,018,574 A | 4/1977 | Dyer | 51/295 |
| 4,082,521 A | 4/1978 | McGarvey | 51/295 |
| 4,394,340 A | 7/1983 | Tarumi et al. | 264/219 |
| 4,457,766 A | 7/1984 | Caul | 51/298 |
| 4,474,585 A | 10/1984 | Gruber | 51/298 |
| 4,547,204 A | 10/1985 | Caul | 51/298 |
| 4,588,419 A | 5/1986 | Caul et al. | 51/295 |
| 4,642,126 A | 2/1987 | Zador et al. | 51/295 |
| 4,644,703 A | 2/1987 | Kaczmarek et al. | 51/401 |
| 4,652,274 A | 3/1987 | Boettcher et al. | 51/293 |
| 4,736,549 A | 4/1988 | Toillie | 51/399 |
| 4,740,577 A | 4/1988 | DeVoe et al. | 528/51 |
| 4,894,280 A | 1/1990 | Guthrie et al. | 428/224 |
| 4,903,440 A | 2/1990 | Larson et al. | 51/298 |
| 4,950,696 A | 8/1990 | Palazotto et al. | 522/25 |
| 5,011,513 A | 4/1991 | Zador et al. | 51/295 |
| 5,091,439 A | 2/1992 | Berner et al. | 522/26 |
| 5,219,505 A | 6/1993 | Kaiser | 264/138 |
| 5,236,472 A | 8/1993 | Kirk et al. | 51/298 |
| 5,316,812 A | 5/1994 | Stout et al. | 428/64 |
| 5,344,688 A | 9/1994 | Peterson et al. | 428/102 |
| 5,436,063 A | 7/1995 | Follett et al. | 428/224 |
| 5,573,619 A | 11/1996 | Benedict et al. | 156/137 |
| 5,575,873 A | * 11/1996 | Pieper et al. | 156/153 |
| 5,578,096 A | 11/1996 | Christianson et al. | 51/295 |
| 5,578,343 A | * 11/1996 | Gaeta et al. | 427/202 |
| 5,584,897 A | 12/1996 | Christianson et al. | 51/295 |
| 5,609,706 A | 3/1997 | Benedict et al. | 156/137 |
| 5,681,612 A | 10/1997 | Benedict et al. | 427/240 |
| 5,700,302 A | * 12/1997 | Stoetzel et al. | 51/295 |
| 5,830,248 A | * 11/1998 | Christianson et al. | 51/295 |

FOREIGN PATENT DOCUMENTS

| | | |
|---|---|---|
| EP | 0 115 160 A2 | 8/1984 |
| EP | 0 500 369 A | 8/1992 |
| WO | WO 86/02306 | 4/1986 |
| WO | WO 93/12911 | 7/1993 |
| WO | WO 95/00294 | 1/1995 |
| WO | WO 95/22434 | 8/1995 |
| WO | WO 95/22438 | 8/1995 |

\* cited by examiner

Primary Examiner—William P. Watkins, III
(74) Attorney, Agent, or Firm—Scott R. Pribnow

(57) ABSTRACT

Seamless backings and seamless coated abrasive articles are provided. The seamless backings and seamless coated abrasive articles have a backing binder formed from a backing binder precursor comprising an aromatic polyisocyanate prepolymer, a polyol curative, an acrylated urethane, and at least one polymerization agent. Also provided is a method for preparing seamless backings and seamless coated abrasive articles.

42 Claims, 2 Drawing Sheets

ABRASIVE ARTICLE WITH SEAMLESS BACKING

BACKGROUND

The present invention relates to seamless backings for seamless coated abrasive articles. Additionally, this invention relates to methods of preparing seamless backings and seamless coated abrasive articles.

Backings or substrates used in coated abrasive articles are typically made of paper, polymeric materials, cloth, non-woven materials, vulcanized paper, or combinations of these materials. Many of these materials provide unacceptable backings for certain applications because they do not have sufficient strength, flexibility, or impact-resistance. In addition, some of these materials age too rapidly which is unacceptable. Furthermore, some of the materials are sensitive to liquids that are used as coolants and cutting fluids. Accordingly, early failure and poor functioning can occur in certain applications.

In a typical manufacturing process, a coated abrasive article is made by feeding a preformed backing in a continuous web form through a series of coating and curing steps wherein binder layers and abrasive particles are applied. The coated web is then converted into a desired construction, such as a sheet, disc, belt or the like. One useful construction of a coated abrasive article is an endless coated abrasive belt (i.e., a continuous loop of coated abrasive material). In order to form such an endless belt, the web form is typically cut into an elongate strip of a desired width and length. The ends of the elongate strip are then joined together to create a "joint" or a "splice". Two types of splices are common in endless abrasive belts. These are the "lap" splice and the "butt" splice.

Although endless coated abrasive belts containing a splice in the backing are widely used in industry today, these products suffer from some disadvantages which can be attributed to the splice. For example, the splice is generally thicker than the rest of the coated abrasive belt, even though the methods of splicing generally used involve attempts to minimize this variation in the thickness along the length of the belt. This can lead to a region on the workpiece with a "coarser" surface finish than the remainder of the workpiece, which is highly undesirable, especially in high precision grinding applications. For example, wood with areas having a coarser surface finish will stain darker than the remainder of the wood. Also, the splice can be the weakest area or link in the coated abrasive belt. In extreme cases the splice may break prematurely before full utilization of the coated abrasive belt, which leads not only to waste, but potential hazard. Belts have therefore often been made with laminated liners or backings to give added strength and support. Such belts can be relatively expensive and, under certain conditions, can be subject to separation of the laminated layers. In addition, abrading machines that utilize a coated abrasive belt may have difficulty in properly tracking and aligning the belt because the splice creates a discontinuity in the coated abrasive belt. Furthermore, the spliced area can be undesirably more stiff than the remainder of the belt, and belts including such a splice may put undesirable "chatter" marks on the workpiece. Finally, the splice in the belt backing adds considerable expense in the manufacturing process of coated abrasive belts.

There are known processes for producing seamless abrasive belts. For example, Ball (U.S. Pat. No. 2,404,207) discloses belts produced by a method that utilizes a carrier belt that is rotated around support rolls. A comb removes a carded membrane from a stripper roll to thereby deposit the carded membrane upon the rotating carrier belt. Accordingly, layers of carded membrane are incrementally deposited around a peripheral surface of the carrier belt as the carrier belt is rotated around the support rolls. The carded membrane can be comprised of fibrous materials such that layers of fibrous materials form a web about the carrier belt. A pressure roll is used to compact the web and impregnate the web with an adhesive binder material. Abrasive particles can also be distributed upon the carrier belt through two different control hoppers.

PCT International Publication No. WO 93/12911, published Jul. 8, 1993, discloses coated abrasives using fiber reinforced polymeric backings. In producing the backing, the fibers are engulfed by a polymer and the polymer is then solidified or cured, depending on the polymer's chemistry. Abrasive particles are then adhered to the backing by a subsequent resin coating applied to the backing (sometimes referred to as a "make" coating), typically a resole phenolic resin. The procedures for making the fiber reinforced backings are essentially batch procedures.

U.S. Pat. No. 5,681,612 (Benedict et al.) reports methods for preparing endless, flexible, seamless abrasive backings containing an organic binder material and a fibrous material embedded therein. The preferred method of forming endless, seamless abrasive backings in Benedict et al. is a batch process. The circumference of the belt. The backing binder precursor is coated onto the periphery of the drum and is solidified by exposure to an energy source (e.g., thermal or radiation energy). Before the backing can be removed from the drum, the binder precursor must be sufficiently cured or polymerized so that the binder precursor retains its shape (i.e., does not flow substantially) when removed from the drum.

In Benedict et al., preferred organic binder materials are thermosetting resins such as epoxy resins, urethane resins, polyester resins, or flexible phenolic resins. The most preferred resins are epoxy resins and urethane resins, at least in part because they exhibit acceptable cure rate, flexibility, thermal stability, strength and water resistance. Although these binder materials exhibit acceptable cure rates for thermally cured systems, they typically require a thermal cure on the drum for at least 20 minutes. Since the method of making endless, seamless abrasive backings is a batch process, the production rate is proportional to the time it takes to cure the binder precursor on the drum. For this reason, it is desirable to provide faster method of producing endless, seamless abrasive backings. In addition, it is desirable to provide a backing binder which has improved performance, for example, a decreased sensitivity to water and increased thermal resistance.

SUMMARY

The present invention provides seamless backings for seamless coated abrasive articles (i.e., coated abrasive belts or loops) which have improved properties over known seamless backings. For example, the backing binder of a seamless backing of the present invention is more resistant to water (i.e., a lower water absorption) than conventional backing binders. In addition, the backing binder can be cured very quickly by exposure to radiation energy (e.g., ultraviolet light) allowing seamless backings of the present invention to be rapidly manufactured.

In one aspect, the present invention provides a seamless backing in the form of a belt (i.e., having a length, a width, a first and second generally parallel side edges, a first major exterior surface, and a second major interior surface). The seamless backing includes a backing binder comprising an interpenetrating polymer network formed by the polymerization of a backing binder precursor. The backing binder precursor includes:

(i) an aromatic polyisocyanate prepolymer;
(ii) a polyol curative;
(iii) an acrylated urethane; and
(iv) at least one polymerization agent.

The seamless backing further includes at least one fibrous reinforcing material which is engulfed within the backing binder. The term "seamless" means that the backing has a substantially uniform thickness or caliper throughout. That is, it is free from thickened areas resulting from distinct splices or joints. This does not preclude, however, splices and/or gaps in a fibrous reinforcing material embedded within the backing. The term "engulfed" means that the fibrous reinforcing material is essentially completely encapsulated or embedded within the backing binder, so that there may be a very minor percentage of fibrous reinforcing material present at an outer surface of the backing.

The backing binder is formed by the polymerization of the backing binder precursor. The backing binder precursor comprises an aromatic polyisocyanate prepolymer, a polyol curative, an acrylated urethane, and at least one polymerization agent. As used herein "polyisocyanate prepolymer" is a material that is intermediate between a monomer and a final polymer. A polyisocyanate prepolymer is the reaction product of a monomeric or polymeric isocyanate with itself or with other isocyanate reactive materials such that the polyisocyanate prepolymer has, on average, more than one unreacted isocyanate group per molecule. Isocyanate reactive materials include active hydrogen compounds, for example, polyols, polyamines, amine terminated polyols, and water.

The backing binder precursor cures via two distinct polymerization reactions (i.e., a dual cure mechanism) which occur simultaneously. A first polymerization reaction is an addition polymerization of the polyisocyanate with the polyol. Together, the polyisocyanate prepolymer and the polyol curative form a polyurethane precursor, that is, a composition which is capable of curing to form a polyurethane polymer. A second polymerization reaction is a free radical polymerization of the acrylate groups of the acrylated urethane to form a crosslinked acrylate.

The polyurethane and the crosslinked acrylate form an interpenetrating polymer network. As used herein "interpenetrating polymer network" or "interpenetrating network" means a mixture of two or more distinct polymers which are held together by permanent entanglements. The polymers may also be held together by some covalent bonding.

The backing binder precursor polymerizes to form an elastomeric binder. As used herein "elastomeric" means that the binder is flexible and has an elongation at break of at least 50%.

Preferred aromatic polyisocyanate prepolymers are based on 4,4'-diphenylmethane diisocyanate (MDI) and have a functionality ranging from about 2 to 3. As used herein "based on" means that the polyisocyanate prepolymer uses the designated isocyanate as the isocyanate starting material from which the polyisocyanate prepolymer is formed. For example, "based on MDI" means that the polyisocyanate prepolymer uses MDI as the isocyanate starting material of the polyisocyanate prepolymer.

Preferred polyol curatives are saturated polyether diols having the molecular formula $HO[(CH_2)_4O]_nH$.

A preferred acrylated urethane is formed by reacting 2-hydroxyethyl acrylate with an aromatic polyisocyanate prepolymer based on MDI. Preferably, the acrylated urethane has less than about 0.01% by wt. residual urethane catalyst.

The backing binder precursor further comprises at least one polymerization agent. As used herein a "polymerization agent" is a material which initiates and/or catalyzes a polymerization (i.e., curing) of the backing binder precursor. Preferred polymerization agents are urethene catalysts and free radical initiators. Preferred urethane catalysts are radiation activated urethane catalysts such as those described in U.S. Pat. Nos. 4,740,577 (DeVoe et al.) and 5,091,439 (Berner et al.).

In another aspect, the present invention provides a seamless coated abrasive article made from a seamless backing of the present invention. A preferred seamless coated abrasive article of the present invention includes a seamless backing of the present invention having an abrasive coating adhered to the exterior major surface thereof. The abrasive coating comprises a plurality of abrasive particles adhered to the seamless backing by a coating (i.e., a make coat) or multiple of coatings (i.e., a make coat and a size coat). Preferred make and size coatings comprise phenolic resins, more preferably resole phenolic resins. Optionally, a supersize coating may be applied over the size coat to provide a specific property such as antiloading.

In another aspect, the present invention provides a method for preparing a coated abrasive backing; the method including the steps of:

(a) providing a support drum having a peripheral surface;
(b) applying at least one fibrous reinforcing material over the peripheral surface of the drum;
(c) applying a backing binder precursor over the fibrous reinforcing material in sufficient amount to engulf the fibrous reinforcing material, the backing binder precursor comprising a mixture of:
    (i) an aromatic polyisocyanate prepolymer;
    (ii) a polyol curative;
    (iii) an acrylated urethane; and
    (iv) at least one polymerization agent;
(d) exposing the backing binder precursor to radiation energy to polymerize the backing binder precursor thereby forming an interpenetrating polymer network; and
(e) removing the seamless backing from the support drum.

In a preferred method, the peripheral surface of the support drum is first wrapped with a nonwoven mat, for example, a spunbond polyamide mat. Following application of the nonwoven mat, a continuous fibrous strand is wrapped in helical fashion around the drum over the nonwoven mat using a level winder. During the winding process, the backing binder precursor is applied over the nonwoven mat and continuous fibrous strand. The backing binder precursor engulfs the fibrous reinforcing materials.

The backing binder precursor is preferably supplied to the drum via a "meter and mix" apparatus. The meter and mix apparatus consists of two separate vessels (i.e., vessel "A" and vessel "B") with separate supply lines and pumping means. The separate supply lines feed a motionless mixer which functions to mix the material from vessel A with the material from vessel B. Vessel A holds the aromatic polyisocyanate prepolymer, and any desired optional ingredients (e.g., a polymerization agent or filler). Vessel B holds a mixture comprising a polyol curative, an acrylated urethane, and any desired optional ingredients (e.g., a polymerization agent). During the preferred method, the materials from vessel A and vessel B are mixed by the meter and mix system to form the backing binder precursor which is then applied over the fibrous reinforcing materials which are wrapped around the support drum. During application of the backing binder precursor, the coating head traverses the peripheral surface of the support drum following the level winder.

In a preferred embodiment, the acrylated urethane has less than about 0.01% by wt. residual urethane catalyst. In this way, the rate of the polymerization of the polyisocyanate prepolymer with the polyol is minimized until after the backing binder precursor is coated onto the fibrous reinforcing material.

Polymerization of the backing binder precursor may be accelerated by exposure of the backing binder precursor to a source of radiation energy. Preferably, the radiation energy is ultra violet light, or a combination thereof. In a preferred embodiment, the polymerization agent of the backing binder precursor comprises a free radical photoinitiator and a radiation activated urethane catalyst, which are both activated by ultraviolet light.

DETAILED DESCRIPTION OF PREFERRED EMBODIMENTS

Figure 1:
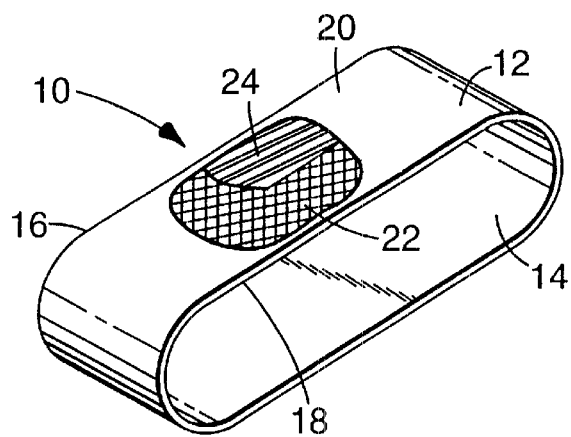
FIG. 1 is a perspective view of a seamless abrasive backing of the present invention with a partial fragmentary view showing the fibrous reinforcing material.

A preferred embodiment of a seamless backing of the present invention is illustrated in FIG. 1. Seamless backing 10 takes the form of a belt or loop having first major exterior surface 12, second major interior surface 14, and generally parallel side edges 16 and 18. Backing 10 comprises backing binder 20 which engulfs fibrous web 22 and continuous fibrous strand 24. Continuous fibrous strand 24 is generally parallel to side edges 16 and 18. Fibrous web 22 lies to the interior (i.e., nearer second major interior surface 14) of fibrous reinforcing strand 24. Backing binder 20 engulfs both fibrous web 22 and continuous fibrous strand 24 and forms a smooth continuous layer at first major exterior surface 12 and at second major interior surface 14. Backing binder 20 is continuous throughout the thickness and width of backing 10. Backing binder 20 surrounds the fibrous reinforcing materials (i.e., continuous fibrous strand 24 and fibrous web 22) and impregnates the fibrous web 22. Seamless backing 10 may be made into a seamless coated abrasive belt by applying an abrasive coating to at least a portion, preferably all, of first major exterior surface 12.

Figure 2:
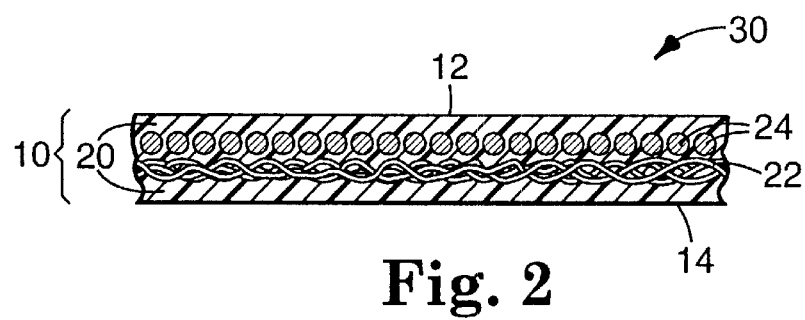
FIG. 2 is a partial cross-sectional view of the seamless abrasive backing of FIG. 1.

Referring now to FIG. 2, an enlarged cross section of the seamless backing of FIG. 1 is shown. Seamless backing 30 has first major exterior surface 12 and second major interior surface 14. Exterior surface 12 and interior surface 14 are substantially smooth. The term "smooth" means that the fibrous reinforcing material generally does not protrude from backing 10, but is substantially completely engulfed by backing binder 20, thereby forming a substantially flat surface. Fibrous web 22 preferably lies in a first plane proximate second major interior surface 14. Continuous fibrous strand 24 lies substantially within a second plane proximate first major exterior surface 12. Backing binder 20 substantially engulfs, surrounds and impregnates continuous fibrous strand 24 and fibrous web 22.

Figure 3:
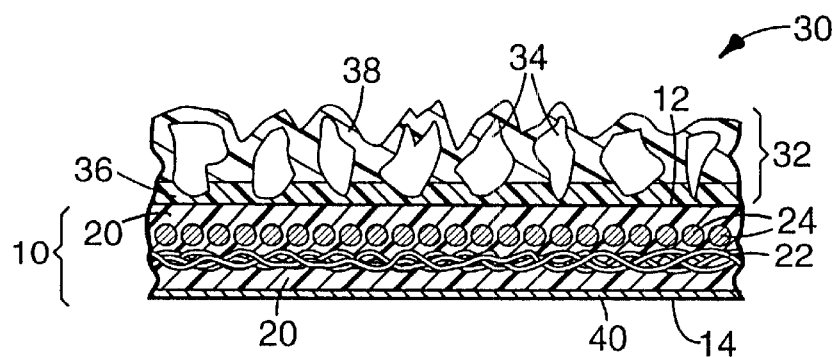
FIG. 3 is a partial cross-sectional view of the seamless abrasive article of the present invention.

Referring now to FIG. 3, an enlarged cross section of a seamless abrasive article is shown. Seamless abrasive article 40 comprises seamless backing 30 (see, FIG. 2) having abrasive coating 32 adhered to the first major surface 12. Abrasive coating 32 comprises abrasive particles 34, make coat 36 and size coat 38. Abrasive particles 34 are partially embedded in make coat 36 which functions to adhere the abrasive particles 34 to backing 10. Size coat 38 provides further anchorage of abrasive particles 34 to backing 10. In certain articles of this invention there is no separate and distinct make coating since backing binder 20 serves both to engulf the fibrous reinforcing materials and to adhere abrasive particles 34. An optional supersize coating (not shown) may be applied over size coat 38. Optional inner layer 40 is shown in FIG. 3. Inner layer 40 may be paper or polymeric film which is included to increase the tear resistance, reduce backwear and/or to increase the aesthetic appearance of the seamless coated abrasive article.

Backing Binder & Backing Binder Precursor

Seamless backings and seamless coated abrasive belts of the present invention comprise at least one fibrous reinforcing material engulfed by a polymerized (i.e., cured) backing binder 20 (see FIGS. 1 and 2). The backing binder is a polymeric material which is formed by polymerizing a backing binder precursor. Backing binder precursors are flowable materials which are capable of being polymerized to form a substantially non-flowable state.

Polymerization of the backing binder precursor may be initiated and/or accelerated by exposing the backing binder precursor to an energy source. Typically and preferably, polymerization of the backing binder precursor is initiated and/or accelerated by exposure to radiation energy, preferably ultraviolet light, visible light, or a combination thereof. As used herein "ultraviolet light" or "ultraviolet radiation" refers to light having a wavelength ranging from about 200 to 400 nm. As used herein "visible light" or visible radiation" refers to light having a wavelength ranging from about 400 to 700 nm. Radiation energy initiates and/or accelerates the polymerization of the backing binder precursor by interacting with the polymerization agent, which upon exposure to radiation initiates free radical polymerization (photoinitiator) and/or catalyzes the reaction of the polyol curative with the polyisocyanate prepolymer (radiation activated urethane catalyst).

Typically, the amount of backing binder in a seamless baking of the present invention ranges from about 30 to 80% by wt., preferably ranging from about 40 to 75% by wt., more preferably ranging from about 50 to 70% by wt., and most preferably ranging from about 55 to 65% by wt., of the total weight of the backing.

Suitable backing binder precursors comprise a mixture of an aromatic polyisocyanate prepolymer, a polyol curative, an acrylated urethane, and at least one polymerization agent. The polyisocyanate prepolymer and the polyol components of the backing binder precursor may be referred to as a polyurethane precursor since the components cure (i.e., polymerize) to form a polyurethane polymer.

The backing binder precursor cures via two distinct polymerization reactions (i.e., a dual-cure mechanism) which occur simultaneously. A first polymerization mechanism is an addition polymerization of the polyisocyanate prepolymer with the polyol curative. Specifically, isocyanate groups of the polyisocyanate prepolymer react with the hydroxyl groups of the polyol curative to form urethane linkages. In addition, isocyanate groups may also react with other "active hydrogen" functional groups in the backing binder precursor. For example, isocyanate groups may react with urethane groups or amine groups to form allophonate groups or substituted urea groups, respectively. Taken together, the reactions of the isocyanate groups comprise the first polymerization reaction.

A second polymerization reaction is a free radical polymerization of the acrylate groups of the acrylated urethane. The acrylate groups react with one another via the free radical polymerization mechanism to form a crosslinked polyacrylate having urethane functionality. Together, the addition polymerization and the free radical polymerization provide the dual-cure mechanism.

The dual-cure reaction mechanism of the backing binder precursor results in the formation of an interpenetrating polymer network in the polymerized binder. The interpenetrating polymer network includes two distinct polymers (i.e., a crosslinked acrylate and a polyurethane) which are held together by permanent entanglements and possibly some covalent bonding. Specifically, the interpenetrating polymer network is a simultaneous interpenetrating network since the polyisocyanate prepolymer, polyol curative, and acrylated urethane are mixed together and are simultaneously polymerized to form the network. Interpenetrating polymer networks are further described in "Polymer Networks, Principles of their Formation, Structure and Properties" edited by R. F. T. Stepto, published by Blackie Academic & Professional, London, 1998.

Typically, the backing binder precursor comprises from about 10 to 40% by wt. acrylated urethane and about 60 to 90% by wt. polyurethane precursor (i.e., precursor comprises about 15 to 30% by wt. acrylated urethane and about 70 to 85 % by wt. polyurethane precursor. Most preferably, the backing binder precursor comprises about 15 to 25% by wt. acrylated urethane and about 75 to 85% by wt. polyurethane precursor. The polyurethane precursor is formulated such that the molar ratio of isocyante groups to hydroxyl groups (i.e., moles NCO/moles OH) ranges from about 1.1 to 1.25. It is understood by those of skill in the art that a molar excess of isocyanate groups is generally preferred in polyurethane precursor formulations since isocyanate groups readily react with water, which may be present in the atmosphere or in the materials used to make the seamless backing (e.g., paper liners, fibrous reinforcing materials). Hence, a molar excess (i.e., a NCO/OH ratio greater than 1) of isocyanate groups is typically preferred to compensate for the loss of some isocyanate groups due to the reaction with water.

Polyisocyanate Prepolymer

Polyisocyanate prepolymers suitable for use in the present invention include those based on aromatic or aliphatic isocyanates. A polyisocyanate prepolymer refers to a material which is intermediate between a monomer and a final polymer. A polyisocyanate prepolymer is the reaction product of a polyisocyanate monomer or polymer with itself or with other isocyanate reactive materials such that the polyisocyanate prepolymer has, on average, more than one unreacted isocyanate group per molecule. Isocyanate reactive materials include active hydrogen compounds, for example, polyols (e.g., diols, triols), polyamines (e.g., diamines, triamines), amine terminated polyols, and water. Preferably, the polyisocyanate prepolymer is based on an aromatic polyisocyanate such as MDI (i.e., 4,4'-diphenylmethane diisocyanate), TDI (i.e., toluene diisocyanate), or 1,4 phenylene diisocyanate. Most preferably, the polyisocyanate prepolymer is based on MDI.

Polyisocyanate prepolymers based upon aromatic isocyanates are preferred due to their high reactivity and low cost relative to prepolymers based upon aliphatic isocyanates. Preferably, the isocyanate reactive material is a polyol, more preferably a polyether diol, a polyether triol or a mixture thereof.

Suitable polyisocyanate prepolymers have a molecular weight ranging from about 100 to 1200 grams/mole, preferably ranging from about 300 to 1100 grams/mole, and have an isocyanate (i.e., NCO) content ranging from about 5 to 30% by wt., preferably ranging from about 7 to 25% by wt. Preferred polyisocyanate prepolymers have an isocyanate functionality (i.e., the number of isocyanate groups per polyisocyanate prepolymer molecule) ranging from about 2 to 3. In order to be coatable without adding solvent, suitable polyisocyanate prepolymers are liquid at ambient temperatures. Preferably, the viscosity of the polyisocyanate prepolymers is less than about 3000 cps, more preferably ranging from about 500 to 2000 cps.

Suitable commercially available aromatic polyisocyanate prepolymers are those available under the trade designations "DESMODUR E 744" (aromatic polyisocyanate prepolymer based on MDI having an NCO content of 23.0%-24.0%) and "DESMODUR E 743" (aromatic polyisocyanate prepolymer based on MDI having an NCO content of 7.8%-8.2%) from Bayer Industrial Chemicals Division, Pittsburgh, Pa. A particularly preferred polyisocyanate prepolymer comprises a mixture or blend of about 50% to 80% DESMODUR E 744 and about 20% to 50% DESMODUR E 743.

Polyol Curative

The backing binder precursor further includes a polyol curative. As used herein "polyol" or "polyol curative" refers to a compound having an organic backbone having 2 or more terminal or pendant hydroxyl groups. During polymerization (i.e., cure) of the backing binder precursor, the hydroxyl groups of the polyol curative react with isocyanate groups of the polyisocyanate prepolymer forming urethane linkages (i.e., forming a polyurethane). The backbone of the polyol curative may be saturated or unsaturated, aliphatic or aromatic, hydrocarbon, polyether, polyester, or polyacrylate. Preferably, the backbone is a polyether, most preferably a saturated polyether derived from the polymerization of tetrahydrofuran. Polyether polyol curatives which are derived from the polymerization of tetrahydrofuran may be described as poly(tetramethylene glycol) or poly(tetramethylene oxide) polyols. The hydroxyl groups of the polyol curative may have primary, secondary, or tertiary molecular structure. Preferably, the hydroxyl groups are primary since they have a higher rate of reactivity with isocyanates than secondary or tertiary hydroxyl groups.

Suitable polyol curatives have a functionality (i.e., the number of hydroxyl groups per molecule) of 2 or greater. Preferably, the polyol curatives have a functionality of 2 or 3, with 2 (i.e., diols) being most preferred. A mixture of polyol curatives may have a non-integer functionality. For example, a non-integer functionality of 2.5 may be provided by a mixture of one polyol curative having a functionality of 2 (i.e., a diol) with a second polyol curative having a functionality of three (i.e., a triol). Preferably, the functionality of the polyol curative ranges from about 2 to 3, more preferably ranging from about 2 to 2.5.

The molecular weight of suitable polyol curatives ranges from about 100 to 1000 grams/mole, preferably ranging from about 200 to 500 grams/mole. To provide a coatable backing binder precursor without adding a solvent, preferred polyol curatives are liquid at ambient temperatures.

Suitable commercially available polyol curatives are those available under the trade designation "POLYTHF" from BASF Corp., Mount Olive, N.J. A particularly preferred polyol curative is commercially available from BASF Corp. under the trade designation "POLYTHF POLYETHER DIOL 250" (difunctional, linear, saturated polyether polyol derived from the polymerization of tetrahydrofuran having the molecular formula $HO[(CH_2)_4O]_nH$ and a molecular weight of 250±25 grams/mole).

Acrylated Urethane

A third component of the backing binder precursor is an acrylated urethane. As used herein "acrylated urethane" or "urethane acrylate" refers to an acrylate or methacrylate functional polyurethane. An acrylated urethane has the structure shown in formula I.

Formula I:

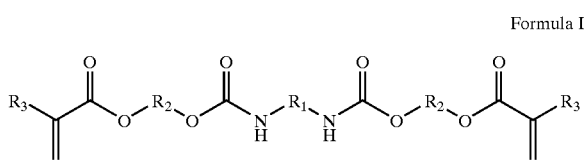

Formula I

The acrylated urethane is typically and preferably formed by reacting a polyisocyanate prepolymer with a stochiometric excess of a hydroxy functional acrylate in the presence of a catalyst, for example, stannous octoate. A hydroxy functional acrylate has the structure shown in formula II.

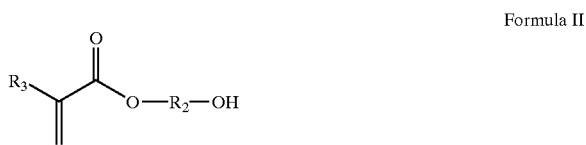

Formula II

In formulas I and II, $R_2$ is a difunctional aliphatic or cyclic (i.e., closed ring (e.g., aromatic)) hydrocarbon radical which may optionally contain oxygen, nitrogen, or halogen. Preferably, $R_2$ is a difunctional aliphatic radical having the general formula $C_nH_{2n}$ where n is 2 to 12, more preferably 2 to 6, and most preferably 2.

In formulas I and II, $R_3$ is —H or an alkyl group having the formula $C_nH_{2n+1}$ wherein n ranges from 1 to 2. More preferably, $R_3$ is —H or —$CH_3$. Most preferably, $R_3$ is —H.

A polyisocyanate prepolymer has the structure shown in Formula III.

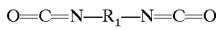 Formula III:

In formulas I and III, $R_1$ is the backbone of the polyisocyanate prepolymer. The polyisocyanate prepolymer is formed by reacting an aliphatic or aromatic isocyanate with an isocyanate reactive material. Isocyanate reactive materials include active hydrogen compounds, for example, polyols (e.g., diols, triols), polyamines (e.g., diamines, triamines), amine terminated polyols, and water. Preferably, the polyisocyanate prepolymer is formed by reacting an aromatic isocyanate with a polyol. More preferably, the polyisocyanate prepolymer is formed by reacting MDI with a diol, preferably a polyether diol. A particularly preferred polyisocyanate prepolymer is commercially available under the trade designation "DESMODUR E 743" (E —743 is an aromatic polyisocyanate prepolymer based on MDI having a NCO content of 7.8%-8.2%) from Bayer Industrial Chemicals Division, Pittsburgh, Pa.

To prepare an acrylated urethane, a hydroxy (i.e., —OH) functional acrylate is reacted with a polyisocyanate prepolymer. Preferably, a stochiometric excess of a hydroxy functional acrylate is reacted with the polyisocyanate prepolymer. A stochiometric excess is preferred in order to minimize the amount of unreacted isocyanate groups in the acrylated urethane. Typically, the molar ratio of hydroxy groups to isocyanate groups (i.e., moles OH/moles NCO) ranges from about 0.9 to 1.1, preferably ranging from about 1 to 1.05. In order to speed the reaction, the hydroxy functional acrylate and polyisocyanate prepolymer are typically reacted in the presence of a urethane catalyst. As used herein "urethane catalyst" refers to a material which catalyzes the reaction of an isocyanate with an active hydrogen compound. Suitable urethane catalysts are well known to those of skill in the art and include, for example, stannous octoate and dibutyl tin dilaurate.

A preferred acrylated urethane is formed by reacting a stochiometric excess of 2-hydroxyethyl acrylate with a MDI based polyisocyanate prepolymer, preferably the MDI based prepolymer known under the trade designation "DESMODUR E 743" (commercially available from Bayer Industrial Chemicals Division, Pittsburgh, Pa.). Optionally, a urethane catalyst (e.g., stannous octoate) may be used to speed the reaction. Typically, about $1\times10^{-4}$ to $1\times10^{-6}\%$ by wt. urethane catalyst is added.

Examples of commercially available acrylated urethanes useful in backing binder precursors include those having the trade names "UVITHANE 782" (available from Morton International, Cincinnati, Ohio), "EBECRYL 6602" (a trifunctional aromatic acrylated urethane diluted with 40% ethoxylated trimethylolpropane triacrylate), "EBECRYL 8402" (a difunctional aliphatic acrylated urethane) and "EBECRYL 8804" (a difunctional aliphatic acrylated urethane) ("EBECRYL" acrylated urethanes are available from UCB Chemicals, Atlanta, Ga.

Acrylated urethanes suitable for use in backing binder precursors are elastomeric when cured. As used herein "elastomeric" means that the cured acrylated urethane is flexible and has an elongation at break of at least 50%. The elastomeric properties of a cured acrylated urethane may be controlled, at least in part, by the molecular weight and functionality of the uncured acrylated urethane. That is, as the functionality of the acrylated urethane increases, the elastomeric nature of the cured acrylated urethane decreases. Similarly, as the molecular weight of the acrylated urethane decreases, the elastomeric nature generally decreases. Suitable acrylated urethanes have a functionality ranging from about 2 to 2.2, and a molecular weight ranging from about 500 to 1500 grams/mole. Preferred acrylated urethanes are difunctional (i.e., two acrylate groups per molecule) and have a molecular weight ranging from about 700 to 1300 grams/mole.

Suitable acrylated urethanes have a viscosity at ambient temperature of less than about 200,000 cps, preferably ranging from about 70,000 to 120,000 cps.

Although it is common for residual urethane catalyst to be present in commercially available acrylated urethanes, it has been observed that when an acrylated urethane having residual catalyst is mixed with a polyurethane precursor (i.e., an isocyanate and a polyol curative), the residual catalyst may shorten the pot life of the resulting mixture by catalyzing reactions of the isocyanate. As used herein "pot life" refers to the length of time that the binder precursor remains sufficiently flowable to be coatable. Since a long pot life is desirable for backing binder precursors of the present invention, preferred acrylated urethanes will be substantially free of urethane catalysts. Preferred acrylated urethanes have less than about 0.01% by wt. residual urethane catalyst, more preferably less than about 0.001% by wt. residual urethane catalyst, and most preferably less than about 0.0001% by wt. residual urethane catalyst.

It is also within the scope of this invention to remove or deactivate any residual urethane catalyst prior to the addition of the acrylated urethane to the polyurethane precursor. For example, stannous octoate may be deactivated by reacting it with a strong acid such as phosphoric acid forming tin phosphate and octanoic acid, which do not act as urethane catalysts.

Polymerization agents for Backing Binder Precursor

The backing binder precursor further includes at least one polymerization agent. As used herein "polymerization agent" refers to a material which initiates and/or catalyzes polymerization (i.e., curing) of the backing binder precursor. Preferably, the backing binder precursor includes a polymerization agent for the polyurethane precursor and a polymerization agent for the acrylated urethane.

For the polyurethane precursor, a urethane catalyst is preferred. Urethane catalysts may have relatively continuous catalytic activity or they may have variable catalytic activity. Urethane catalysts having continuous catalytic activity include organometallic compound (e.g., dibutyl tin dilaurate, stannous octoate) and tertiary amine compounds. Urethane catalysts having variable catalytic activity may be activated (i.e., changed from low catalytic activity to high catalytic activity) by exposure to radiation energy.

Examples of radiation activated urethane catalysts are described in U.S. Pat. Nos. 4,740,577 (DeVoe et al.) and 5,091,439 (Berner et al.), the disclosures of which are incorporated herein by reference. An example of a suitable radiation activated urethane catalyst is ($\eta^6$-cumene)($\eta^5$-cyclopentadienyl)-iron(II) hexafluorophosphate which is commercially available under the trade designation "IRGACURE 261" (commercially available from the Ciba Additives, Hawthorne, N.Y.). Typically, a radiation activated urethane catalyst is used in an amount ranging from about 0.1% to 1%, preferably 0.3% to 0.6%, most preferably 0.5% based on the weight of the backing binder precursor.

For the acrylated urethane, a free radical initiator is the preferred polymerization agent. A free radical initiator functions to provide a source of free radicals which initiates free radical polymerization of the acrylated urethane. Examples of free radical initiators that are activated upon exposure to ultraviolet light (i.e., a photoinitiator) and/or heat include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Examples of commercially available photoinitiators include the photoinitiators known under the trade designations "IRGACURE 651" "IRGACURE 184" and "DAROCUR 1173" (commercially available from Ciba Additives, Hawthorne, N.Y.). Typically, the initiator is used in an amount ranging from about 0.1 to 5% by wt., preferably ranging from about 0.5 to 1% by wt. of the backing binder precursor.

Optional Additives

Other materials that may be added to the backing binder precursor for certain applications of the present invention include inorganic and organic fillers, pigments, oils, antistatic agents, flame retardants, heat stabilizers, ultraviolet stabilizers, lubricants, antioxidants, wetting agents, air release agents, and processing aids. A filler is defined as a particulate material, typically having a particle size less than about 100 micrometers, preferably less than about 50 micrometers. Fillers are preferably dispersed uniformly throughout the backing binder precursor. Examples of useful fillers for applications of the present invention include calcium carbonate, silica, calcium metasilicate, cryolite, phenolic fillers, or polyvinyl alcohol fillers. One of skill in the art will appreciate that certain fillers will affect the cure of the backing binder precursor, for example, by blocking or absorbing ultraviolet light which is used to initiate the cure of the backing binder precursor. Typically, a filler will be used in an amount not exceeding about 30% by wt. of the backing binder precursor.

Fibrous Reinforcing Materials

Seamless backings of the present invention include at least one type of fibrous reinforcing material, preferably two types of fibrous reinforcing material. The primary purposes of the fibrous reinforcing material is to increase the tear-resistance and/or stretch-resistance of the backing. Fibrous reinforcing materials may be in the form of fibrous strands, fiber mats or webs, or stitchbonded or weft insertion mats. Typically, the amount of fibrous reinforcing material in a seamless backing of the present invention ranges from about 1 to 80% by wt., preferably about 5 to 50% by wt., more preferably about 8 to 40% by wt., and most preferably about 15 to 40% by wt., based on the total weight of the backing (i.e., backing binder and fibrous reinforcing material).

Seamless backings of the present invention preferably include at least one layer of fibrous strands, or at least one layer of a fibrous reinforcing mat or web structure, or at least one layer of a fibrous reinforcing mat with reinforcing strands incorporated therein. Preferred articles of the present invention incorporate a plurality of layers of fibrous reinforcing material. More preferred articles of the present invention incorporate at least one layer of a fibrous mat or web and at least one layer of fibrous strands, for advantageous strength in both the longitudinal and cross directions. Preferably, the fibrous strands form a distinct layer separate from (i.e., noninterlocking or intertwining with) the fibrous mat or web. For backings including both fibrous reinforcing strands and a fibrous mat or web, the fibrous mat or web is preferably about 1 to 50% by wt., more preferably about 5 to 20% by wt., based on the total weight of the backing, and the fibrous strands are preferably about 5 to 50% by wt., more preferably about 7 to 25% by wt., based on the total weight of the backing.

Fibrous reinforcing materials can be made of any material that increases the strength of the binder. Examples of useful fibrous reinforcing material in applications of the present invention include metallic or nonmetallic fibrous material. The preferred fibrous reinforcing material is nonmetallic. Nonmetallic fibrous materials may be made of glass, carbon, minerals, synthetic or natural heat resistant organic materials, or ceramic materials. Preferred fibrous reinforcing materials for applications of the present invention are organic materials, glass, and ceramic fibrous material. By "heat resistant", it is meant that useable organic materials should be sufficiently resistant to melting, or otherwise softening or breaking down, under the conditions of manufacture and use of the coated abrasives of the present invention. Useful natural organic fibrous materials include wool, silk, cotton, or cellulose. Useful synthetic organic fibrous materials are made from polyvinyl alcohol, nylon, polyester, rayon, polyamide, acrylic, polyolefin, or aramid.

The fibrous reinforcing material can be oriented as desired. That is, the fibrous reinforcing material can be randomly distributed, or the fibers and/or strands can be oriented to extend along a direction desired for imparting improved strength and tear characteristics.

Advantages may be obtained through use of fibrous reinforcing materials of a length as short as 100 micrometers, or as long as needed for a fibrous strand layer formed from one continuous strand. It is preferred that the fibrous strand used be in the form of one continuous strand per layer. That is, it is preferred that the fibrous strand is of a length sufficient to extend around the length (i.e., circumference) of the seamless backing a plurality of times and provide at least one distinct layer of fibrous strands.

The denier of preferred fibrous reinforcing material ranges from about 5 to 5000 denier, typically ranging from about 50 to 2000 denier. More preferably, the fiber denier will range from about 200 to 1200, and most preferably the fiber denier will range from about 500 to 1000. The denier is strongly influenced by the particular type of fibrous reinforcing material employed.

Fibrous strands are commercially available as threads, cords, yarns, rovings, and filaments. Threads and cords are typically assemblages of yarns. A thread has a very high degree of twist with a low friction surface. A cord can be assembled by braiding or twisting yarns and is generally larger than a thread. A yarn is a plurality of fibers or filaments either twisted together or entangled. A roving is a plurality of fibers or filaments pulled together either without a twist or with minimal twist. A filament is a continuous fiber. Both rovings and yarns are composed of individual filaments.

Examples of commercially available glass yarns or rovings are those available from PPG Industries, Inc. Pittsburgh, Pa., under the trade designation "E-GLASS" bobbin yarn; those available from Owens-Corning, Toledo, Ohio, under the trade designation "FIBERGLAS" continuous filament yarn; and Manville Corporation, Toledo, Ohio, under the trade designation "STAR ROV 502" fiberglass roving. The size of glass fiber yarns and rovings are typically expressed in units of yards/lb. Preferred grades of such yarns and rovings are in the range of about 75 to 15,000 yards/lb.

If glass fibrous reinforcing material is used (e.g., glass yarns or rovings), it is preferred that the glass fibrous material be accompanied by an interfacial binding agent (i.e., coupling agent) such as a silane coupling agent, to improve adhesion to the backing binder material. Examples of silane coupling agents include those known under the trade designations "Z-6020" (N-β(aminoethyl)-γ-aminopropyltrimethoxysilane) and "Z-6040" (glycidoxypropyltrimethoxysilane), both available from Dow Corning Corp., Midland, Mich. Also effective silane coupling agents are methacrylate- and vinyl-functional silane coupling agents such as 3-methacryloxypropyltrimethoxysilane, and the like, available under the trade designation "Z-6030" and triacetoxyvinylsilane, available under the trade designation "Z-6075", both available from Dow Corning Corp.

The reinforcing fibers may contain a pretreatment of some kind, prior to being engulfed by the binder. This pretreatment may be an adhesion promoter or a slashing compound. For example, fiberglass fibers may contain a surface treatment, such as an epoxy or urethane which is compatible with fiberglass yarn, to promote adhesion to the backing binder. Examples of such fiberglass yarns are those commercially available under the trade designation "ECG 150 1/0 1.0Z" style 903 and "EC9 33 1X0 Z40" style 903 fiberglass yarns from PPG, Pittsburgh, Pa., and those known under the trade designations "ECG 150 1/0" style 603 and "EC9 33 1X0 0.7Z" style 603 fiberglass yarns from Owens-Corning, Toledo, Ohio.

A fibrous mat or web structure generally increases the tear resistance of seamless backings and seamless coated abrasive articles of the present invention. A fiber mat or web consists of a matrix of fibers with an aspect ratio of at least about 100:1. The aspect ratio of a fiber is the ratio of the longer dimension of the fiber to the shorter dimension. The mat or web can be either in a woven or a nonwoven form. A nonwoven mat is a matrix of a random distribution of fibers. This matrix is typically formed by bonding fibers together either autogenously or by an adhesive. That is, a nonwoven mat is generally described as a sheet or web structure made by bonding or entangling fibers or filaments by mechanical, thermal, or chemical means. A nonwoven mat may be preferred due to its openness, nondirectional strength characteristics, and low cost.

Examples of nonwoven mats suitable for this invention include open, porous staple fiber webs (such as disclosed in assignee's U.S. Pat. No. 2,958,593, comprising staple fibers entangled together and bound at points of mutual contact by a binder (e.g., a phenolic resin)), spun bonded, melt blown, needle punched hydroentangled or thermo-bonded forms. A preferred nonwoven mat is a spun bonded polyamide (i.e., nylon) having a fiber denier of about 4 to 5 and a basis weight of about 6 to 85 grams/m$^2$. Such a nonwoven mat is commercially available under the trade designation "CEREX" from Cerex Advanced Fabrics. The fibrous reinforcing material can also be in the form of a mat structure containing adhesive or melt-bondable fibers. such melt-bondable fibers are disclosed in European Patent Application 340,982, published Nov. 8, 1989, which is incorporated herein by reference. A nonwoven web is typically porous, having a porosity of about 15% or more. Nonwoven mats or webs are further described in "The Nonwovens Handbook" edited by Bernard M. Lichstein, published by the Association of the Nonwoven Fabrics Industry, New York, 1988.

The thickness of a fibrous mat or web in typical applications of the present invention generally ranges from about 25 to 800 micrometers, preferably from about 100 to 375 micrometers. The weight of a preferred fibrous mat structure generally ranges from about 7 to 150 grams/square meter (g/m$^2$), preferably from about 17 to 70 g/m$^2$. Preferably, there are 1 to 10 layers, and more preferably 2 to 5 layers, of the fibrous mat structure in articles of the present invention. Preferably about 1-50% by wt., and more preferably about 5-20% by wt., of the preferred articles of the present invention is the fibrous reinforcing mat.

A preferred fibrous reinforcing mat for applications of the present invention is aramid fibrous material, particularly aramid staple fiber-based nonwoven papers wherein the fibers are bound together by an acrylic latex. Such nonwoven papers are commercially available from Veratec, a division of International Paper Co., Tuxedo, N.Y., and are produced using aramid staple fibers available from E. I. DuPont de Nemours, Inc., Wilmington, Del. under the trade designations "KEVLAR" and "NOMEX."

A suitable fibrous reinforcing material may also comprise a composite of a woven or nonwoven mat continuous strands of fibers or yarns. For example, a plurality of parallel polyester yarns may be thermo-bonded onto a nonwoven made of organic melt-bonded staple fibers, such as core/sheath melt-bonded fibers. One preferred composite comprises from about 50 to 80% by wt. (more preferably from about 60 to 70% by wt.) of core-sheath melt-bonded fibers and about 20 to 50% by wt. (more preferably from about 30 to 40% by wt.) of polyester continuous parallel fibers. Both the core and the sheath of the core-sheath fibers comprise polyester, the sheath polyester having lower melting temperature than the core polyester. The continuous parallel fibers have a melting temperature about the same as the melting temperature of the polyester forming the core of the core-sheath fiber. Such webs have a density ranging from about 0.30 to about 0.40 g/cm$^3$.

Ceramic fibrous reinforcing material may be useful in applications of the present invention. An example of a ceramic fibrous reinforcing material suitable for the present invention is known under the trade designation "NEXTEL" (commercially available from Minnesota Mining and Manufacturing Co., St. Paul, Minn.). An example of a useful ceramic fibrous reinforcing mat is known under the trade designation "440 ULTRAFIBER MAT" (commercially available from Minnesota Mining and Manufacturing Co., St. Paul, Minn.). These mats are nonwovens of fine ceramic fibers with no shot, and with no binders added to the mat. The fibers have fiber diameters ranging from about 2 to about 4 micrometers, with fiber lengths ranging from about 2 to about 25 cm. The mats preferably have widths ranging from about 10 to 40 cm; thicknesses ranging from about 1 to 3 cm; weight per unit area ranging from about 160 to 210 g/m$^2$; and bulk density (with mat thickness of 2.0 cm) ranging from about 8 to 11 kg/m$^3$. The ceramic fibers making up the "440" mats consist of 70 wt. % alumina ($Al_2O_3$), 28 wt. % silica ($SiO_2$), and 2 wt. % boria ($B_2O_3$).

There are a number of organic and synthetic fiber scrims that are useful for the fibrous material. Examples of organic materials include cotton, canvas and wool. Examples of synthetic scrims include nylon, woven nylon, fiberglass, rayon, polyester and "Kevlar." The basic physical requirements of a substrate determine the type of materials that are needed to produce the substrate.

Abrasive Coating

A seamless backing of the present invention is converted into a seamless coated abrasive article of the present invention by applying an abrasive coating to at least a portion of at least one major surface thereof. Typically, the abrasive coating is applied over the exterior major surface of the seamless backing to provide an abrasive article in the form of a belt or a loop having an abrasive coating on the exterior.

The abrasive coating comprises a plurality of abrasive particles which are adhered to the backing by a single coating (i.e., a make coat) or multiple coatings (i.e., a make coat and size coat). The coatings and abrasive particles are applied to the backing in separate steps after the backing has been formed.

A make coat is formed by coating and curing a make coat binder precursor. The make coat binder precursor may be coated by any conventional coating technique, such as knife coating, roll coating, rotogravure coating, and the like.

Useful make coat binder precursors are those that are compatible with the backing binder and those that are tolerant of grinding conditions (i.e., such that the make coat does not deteriorate and prematurely release the abrasive particles). Examples of suitable thermosetting make coat binder precursors include phenolic resins, aminoplast resins, urethane resins, epoxy resins, acrylated isocyanurate resins, urea-formaldehyde resins, isocyanurate resins, acrylated urethane resins, acrylated epoxy resins, or mixtures thereof. Preferably, the thermosetting make coat binder precursor is a phenolic resin, an aminoplast resin, or a combination thereof. The phenolic resin is preferably a resole phenolic resin. Examples of commercially available phenolic resins include those available under the trade designations "VARCUM" (commercially available from OXY Chem corporation, Dallas, Tex.), "AROFENE" (commercially available from Ashland Chemical Company, Columbus, Ohio), and "BAKELITE" (commercially available from Union Carbide, Danbury, Conn.). A preferred amnioplast resin is one having at least one pendant alpha, beta-unsaturated carbonyl group per molecule, as described in U.S. Pat. Nos. 4,903,440 or 5,236,472, the disclosures of which are incorporated herein by reference.

A size coat is applied over the make coat and abrasive particles. The size coat is formed by coating and curing a size coat binder precursor. The size coat binder precursor may be applied by any conventional technique, such as knife coating, roll coating, rotogravure coating, and the like. Suitable size coat binder precursors include those described above as suitable make coat binder precursors.

The make coat and size coat may optionally contain other materials or additives. These materials include grinding aids, fillers, coupling agents, wetting agents, dyes, pigments, plasticizers, release agents, or combinations thereof. Fillers are typically present in no more than 90% by wt. referred to as additives.

In some instances it may be preferred to apply a supersize coat over the size coat. A supersize coat may include a grinding aid to enhance the abrading characteristics of the coated abrasive. Examples of grinding aids include potassium tetrafluoroborate, cryolite, ammonium cryolite, or sulfur. The supersize coat may comprise a binder and a grinding aid.

Abrasive Materials

Examples of abrasive materials suitable for use in seamless abrasive articles of the present invention include fused aluminum oxide, heat treated aluminum oxide, ceramic aluminum oxide, silicon carbide, alumina zirconia, garnet, diamond, cubic boron nitride, or mixtures thereof. The term "abrasive material" encompasses abrasive particles, agglomerates, or multi-grain abrasive granules. An example of agglomerates is described in U.S. Pat. No. 4,652,275, which is incorporated herein by reference. It is also within the scope of the invention to use diluent erodible agglomerate grains as disclosed in U.S. Pat. No. 5,078,753, the disclosure of which are incorporated herein by reference.

A preferred abrasive material is alumina-based (i.e., aluminum oxide-based) abrasive particles. Useful aluminum oxide grains for applications of the present invention include fused aluminum oxides, heat treated aluminum oxides, and ceramic aluminum oxides. Examples of ceramic aluminum oxides are disclosed in U.S. Pat. Nos. 4,314,827, 4,744,802, 4,770,671, and 4,881,951, all of which are incorporated herein by reference.

The average particle size of the abrasive particles for advantageous applications of the present invention is at least about 0.1 micrometer, preferably at least about 100 micrometers. A grain size of about 100 micrometers corresponds approximately to a coated abrasive grade 120 abrasive particle, according to American National Standards Institute (ANSI) Standard B74.18-1984. The abrasive particles can be oriented, or they can be applied to the binder without orientation, depending upon the desired end use of the coated abrasive.

Method of Making Seamless Coated Abrasive Articles

A method of making a seamless backing of the present invention comprises the steps of:

(a) providing a support drum having a peripheral surface;

(b) applying at least one fibrous reinforcing material over the peripheral surface of the drum;

(c) applying a backing binder precursor over the fibrous reinforcing material in sufficient amount to engulf the fibrous reinforcing material, the backing binder precursor comprising a mixture of:

(i) an aromatic polyisocyanate prepolymer;
(ii) a polyol curative;
(iii) an acrylated urethane; and
(iv) at least one polymerization agent;

(d) exposing the backing binder precursor to radiation energy to polymerize the backing binder precursor thereby forming an interpenetrating polymer network; and (e) removing the seamless backing from the support drum.

Support Drum

A seamless backing of the present invention is preferably manufactured using a support structure in the form of a drum or hub. The seamless belt is formed over the peripheral surface of the support drum, which typically is cylindrical in shape. The support drum can be made from a rigid material such as steel, metal, ceramics, or a strong plastic material. The drum is placed on a mandrel so that it can be rotated at a controlled rate by a motor. This rotation can range anywhere from 0.1 to 500 revolutions per minute (rpm), preferably 1 to 100 rpm, depending on the application.

The drum can be unitary or created of segments or pieces that collapse for easy removal of the seamless backing. If a large seamless article is preferred, the drum is typically made of segments for collapsibility and easy removal of the article. If such a drum is used, the inner surface of the article may contain slight ridges where the segments are joined and form a seam in the drum. Although it is preferred that the inner surface be generally free of ridges, ridges can be tolerated in seamless coated abrasives of the present invention in order to simplify manufacture, especially with large belts.

The dimensions of the drum generally correspond to the dimensions of the seamless backing. The circumference of the drum will generally correspond to the inside circumference of the seamless backing. The width of the seamless backing can be of any value less than or equal to the width of the drum. A single seamless backing can be made on the drum, removed from the drum, and the sides can be trimmed. Additionally, the backing can be slit longitudinally into multiple backings.

Release Coating

In many instances, it may be preferred that a release coating is applied to the periphery of the drum before the binder or any of the other components are applied. A release coating provides for easy release of the backing from the drum after the binder precursor is solidified. In most instances, this release coating will not become part of the seamless coated abrasive. If a collapsible drum is used in the preparation of a backing, such a release liner helps to prevent, or reduce, the formation of ridges in the inner surface of the backing. Examples of release coatings include, but are not limited to, silicones, fluorochemicals, or polymeric films coated with silicones or fluorochemicals. It is also within the scope of this invention to use a second release coating which is placed over the backing binder. This second release coating is typically present during the solidification of the backing binder precursor, and can be removed afterwards.

Backing Inner Layer

In many instances, it may be preferred to provide a paper or polymeric film inner layer to increase the tear resistance, reduce backwear, and/or increase the aesthetic appearance of the seamless coated abrasive article. The paper or polymeric film is applied over the peripheral surface of the drum before the backing binder or any of the other components (e.g., fibrous reinforcing material) are applied. Such a layer bonds to the backing binder thereby forming the inner surface of the seamless backing or seamless coated abrasive article.

Application of Fibrous Reinforcing Material

After application of a release coating or backing inner layer, at least one layer of fibrous reinforcing material is applied. The fibrous reinforcing material can be applied to the outer periphery of the drum in several manners. The particular method of application is typically dictated by the type of fibrous material chosen.

For fibrous reinforcing material in the form of a nonwoven or woven mat or web, the mat or web may be applied by directing it from an unwind station and wrapping it around the drum as the drum rotates. The mat or web may be wound around the drum in helical fashion (i.e., the edge of the mat or web inclined at an angle relative to the edge of the drum) or the mat or web may be wrapped in straight fashion around the drum. If the width of the mat or web is less than the width of the drum, helical winding may be preferred in order to cover the entire width of the drum with a single continuous length of mat or web. Depending upon the particular construction desired, more than one layer of mat or web may be wrapped around the drum. Preferably, there are at least two wraps of the fibrous mat or web. In this way a discreet seam in the layer is avoided.

A preferred method for applying a continuous fibrous strand involves the use of a level winder. In this method, the drum is rotated while the continuous fibrous strand is pulled through the level winder and is wound in helical fashion across the width of the drum. It is preferred that the level winder traverses the entire width of the drum such that the continuous fibrous strand is uniformly applied in a layer across the entire width of the drum. When wound in this fashion, the continuous fibrous strand is provided in a helically wound pattern within the backing binder, with each wrap of the fibrous strand generally parallel to the previous wrap of the fibrous strand.

If the level winder does not move across the entire width of the drum, the continuous fibrous strand may be placed only in a specific portion or portions of the width of the drum, for example, at the edges of the drum.

Additionally, it may be preferable to wind two or more different yarns side by side on the level winder. For example, one yarn may be made of glass and another may be polyester or polyamide.

Preferably, a nonwoven mat of fibrous reinforcing material is first applied to the drum as described above, followed by application of a continuous fibrous strand across the width of the drum using a level winder.

A chopping gun can also be used to apply a fibrous reinforcing material. A chopping gun projects the fibers onto the resin material on the drum, preferably while the drum is rotating and the gun is held stationary. This method is particularly suited when the reinforcing fibers are small (i.e., with a length of less than about 100 millimeters). If the length of the reinforcing fiber is less than about 5 millimeters, the reinforcing fiber can be mixed into and suspended in the backing binder precursor. The resulting backing binder precursor/fibrous material mixture can then be applied to the drum.

Application of the Backing Binder Precursor

The fibrous reinforcing materials can be combined with the backing binder precursor in several manners. For example, the fibrous reinforcing material may be applied directly to the backing binder precursor that has been previously applied to the peripheral surface of the drum, the fibrous reinforcing material may be applied to the drum first followed by the backing binder precursor, or the fibrous reinforcing material and backing binder precursor may be applied to the drum in one continuous operation.

Preferably, a nonwoven mat of fibrous reinforcing material is first applied over the peripheral surface of the drum, followed by simultaneous application of the backing binder precursor and a continuous fibrous strand to the rotating drum. Specifically, as the continuous fibrous strand is wound around the rotating drum using a level winder, the backing binder precursor is applied over the fibrous strand approximately at the point where the fibrous strand is being wound around the drum. The backing binder precursor, which is applied in a liquid state, engulfs the fibrous reinforcing material (i.e., the continuous fibrous strand and the nonwoven mat) and impregnates the nonwoven mat. During the simultaneous coating and winding process, both the winder and the coating head traverse the peripheral surface of the support drum so that both the fibrous strand and the backing binder precursor are applied over the width of the seamless backing which is being formed. Preferably, the coating head is mounted on or attached to the level winder, which provides the means for traversing the peripheral surface of the support drum. Optionally, the level winder may contain an orifice such that as the fibrous strand proceeds through the orifice it is coated with the backing binder precursor. The diameter of the orifice is selected to correspond to the desired amount of backing binder in the backing of the abrasive article.

Due to the reactive nature of the polyisocyanate prepolymer and the polyol curative, they are typically and preferably held in separate vessels until just prior to application of the backing binder precursor to the fibrous reinforcing material. The polyisocyanate prepolymer and the polyol are preferably held in separate vessels since any reaction between them would deleteriously affect the coatability of the backing binder precursor. For example, the viscosity may increase to a level which is undesirable for coating.

Typically and preferably, a first vessel (vessel "A") holds the polyisocyanate prepolymer, radiation activated urethane catalyst, and desired optional ingredients. A second vessel (vessel "B") holds a mixture comprising an acrylated urethane, a polyol curative, a free radical photoinitiator, and desired optional ingredients. Just prior to coating the backing binder precursor, the material from vessel A is mixed with the material from vessel B. Preferably, vessels A and B are connected to segments of pipe that are connected to a static or motionless mixer. The static or motionless mixer mixes the stream of material from vessel A with the stream of material from vessel B thereby forming the backing binder precursor. The flow rate of material from vessel A and vessel B must be controlled so that the mixture formed contains the desired stochiometric ratio of polyisocyanate prepolymer and polyol curative. Once mixed, the backing binder precursor flows into the coating device for application to the fibrous reinforcing materials.

Figure 4:
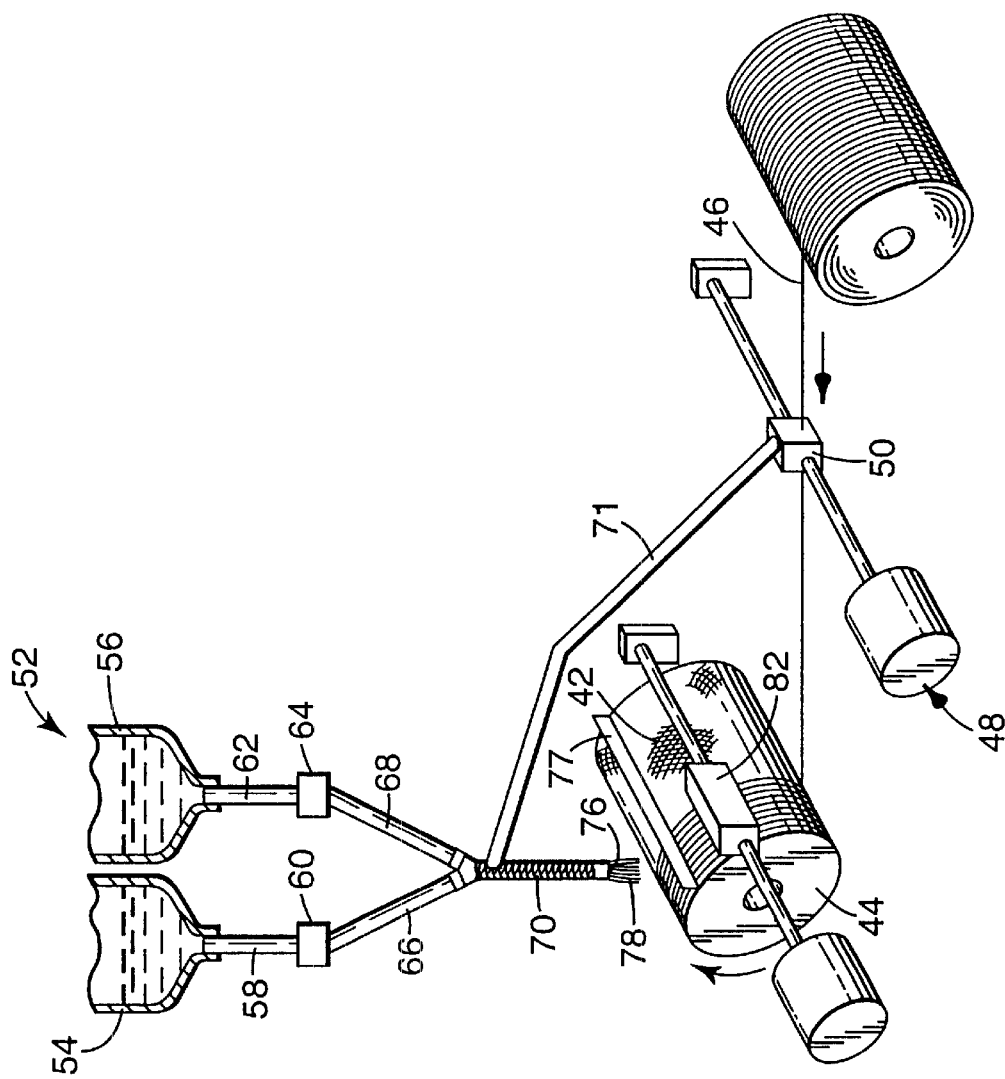
FIG. 4 is a perspective view of the major elements of an apparatus to practice a preferred process for making a seamless backing of the present invention.

Referring now to FIG. 4, a preferred apparatus for making a seamless backing of the present invention is shown. Nonwoven mat 42, preferably a spun bonded nylon nonwoven, is applied to drum 44 in at least one layer, (i.e., such that the mat is wrapped completely around the outer periphery of the drum at least once). To avoid a seam, it is preferable to wrap the mat around the drum 44 at least twice. The mat may be wrapped in helical (i.e., spiral) fashion around the drum, or the mat may be wrapped in straight fashion around the drum.

After application of fibrous mat 42 to drum 44, continuous fibrous strand 46 is then applied over the surface of fibrous mat 42. Application of fibrous strand 46 involves the use of a yarn guide system 48 with a level winder 50. In this method, drum 44 is rotated while continuous fibrous strand 46 is pulled from the spool through level winder 50, and is wound around the peripheral surface of drum 44 over nonwoven mat 42. Continuous fibrous strand 46 is wound around drum 44 in helical fashion. It is preferred that the level winder 50 move across the width of the drum such that the continuous reinforcing fibrous strand 46 is uniformly applied in a layer across the width of the mat 42. Thus, strand 46 is in a helically wound pattern with each wrap of the fibrous strand substantially parallel to the previous wrap of the strand. Optionally, continuous strand 46 may be applied over only portions of the width of the nonwoven mat 42. For example, strand 46 may be applied only near the outer edges of the nonwoven mat 42. Continuous strand 46 is preferably made of glass or polyamide. Optionally, continuous fibrous strands of different materials (e.g., a polyamide strand and a glass strand) may be simultaneously drawn from separate spools and applied over nonwoven mat 42 using level winder 50.

During the winding process, the backing binder precursor 78 is applied by coating system 52. Coating system 52 includes vessel A 54 and vessel B 56. Vessel A is connected to a first end of pipe segment 58. A second end of pipe segment 58 is connected to first metering pump 60. Vessel B 56 is connected to a first end of pipe segment 62. A second end of pipe segment 62 is connected to second metering pump 64. First metering pump 60 is connected to a first end of pipe segment 66. Second metering pump 64 is connected to a first end of pipe segment 68. The second end of pipe segment 66 is connected to a first inlet port of motionless mixer 70. The second end of pipe segment 68 is connected to a second inlet port of motionless mixer 70. Motionless mixer 70 is attached to level winder 50 by arm 71. The second end (i.e., the outlet) of motionless mixer 70 is positioned over drum 44. Optionally, the second end of motionless mixer 70 may be connected to a coating head (not shown) such as a die or extrusion type coating head.

Vessel A 54 holds a mixture comprising a polyisocyanate prepolymer, radiation activated urethane catalyst, and desired optional ingredients. Vessel B 56 holds a mixture comprising an acrylated urethane, a polyol curative, a free radical photoinitiator, and desired optional ingredients. Metering pump 60 draws material from vessel A 54 through pipe segments 58 and 66 and into motionless mixer 70. Second metering pump 64 draws material from vessel B 56 through pipe segments 62 and 68 and into motionless mixer 70. First metering pump 60 and second metering pump 64 are controlled to provide relative flow rates corresponding to the desired stochiometric ratio of the polyisocyanate prepolymer and the polyol curative. In motionless mixer 70 the streams of material from vessel A and vessel B mix to form the backing binder precursor 78. Motionless mixer 70 comprises a series of left and right hand helically shaped baffles. As the fluid moves through motionless mixer 70 it is divided and recombined by the baffles resulting in mixing of the stream of material from vessel A with the stream of material from vessel B. Motionless mixer 70, which is set above drum 44, applies the backing binder precursor 78 to the fibrous reinforcing material which is wrapped around the periphery of drum 44. Preferably, a smoothing blade or doctor blade 77 is positioned behind coating head 76. The smoothing or doctor blade 77 functions to smooth the surface of the backing binder precursor and to force the backing binder precursor to impregnate the fibrous reinforcing material. Typically, the smoothing or doctor blade comprises a polyester film approximately 20 mils (0.5 mm) in thickness.

During the winding of continuous filament 46, motionless mixer 70 traverses the width of drum 44 following level winder 50 and applies the backing binder precursor 78 to the fibrous reinforcing material wrapped around the periphery of drum 44. Sufficient backing binder precursor 78 is applied to provide a layer of backing binder precursor at least above and below the fibrous mat 42 and continuous fibrous strand 46. First metering pump 60 and second metering pump 64 are controlled to provide the desired coating weight of backing binder precursor 78.

Cure of the Backing Binder Precursor

Following the application of the backing binder precursor to the fibrous reinforcing material, the backing binder precursor is polymerized. Polymerization is initiated by exposing the backing binder precursor to a source of radiation energy. Preferably, the backing binder precursor is exposed to ultraviolet light to initiate the polymerization process. A preferred ultraviolet light source is commercially available from Fusion Systems, Inc., Gaithersburg, Md. and comprises a model I-600 irradiator powered by a model P-600 power supply and equipped with a type "D" bulb. The system operates at 236 Watts/cm (600 Watts/inch). Referring to FIG. 4, in a preferred process, ultraviolet lamp 82 is capable of traversing the width of the drum 44. Ultraviolet lamp 82 follows behind level winder 50 and motionless mixer 70. In this way, polymerization of the backing binder precursor is initiated within a short time of the application of the backing binder precursor to the fibrous reinforcing material. This results in an efficient method of making seamless backings since the backing binder precursor is polymerized rapidly after application to the fibrous reinforcing material. The speed of polymerization of the backing binder precursor depends upon factors such as the backing binder precursor formulation (e.g., the type and amount of polymerization agent, the functionality and molecular weight of the acrylated urethane, and the reactivity of the polyisocyanate prepolymer), the backing binder precursor thickness, the presence of additives in the backing binder precursor (e.g., fillers), and the magnitude of exposure to radiation energy (e.g., the intensity, spectral distribution, and duration of exposure to ultraviolet light).

After applying and polymerizing the backing binder precursor, the seamless backing is preferably removed from support drum 44. Optionally, the backing binder precursor may be heated to further polymerize the backing binder precursor.

Additional methods for preparing seamless backings of the present invention may be found, for example, in U.S. Pat. No. 5,681,612 (Benedict et al.), the disclosure of which is incorporated herein by reference.

Application of the Abrasive Coating

After the seamless backing has been fabricated, an abrasive coating is applied to the exterior major surface of the seamless backing. The abrasive coating consists of a make coat, a plurality of abrasive particles embedded in the make coat, a size coat, and optionally a supersize coat. First, the make coat is applied to the backing. Following this, abrasive material, preferably in the form of a plurality of abrasive particles, is then applied to the make coat. The make coat with abrasive particles embedded therein is then at least partially solidified. If the make coat is a thermosetting resin, this solidification process is a curing or polymerization process. Typically, this involves the use of energy, either thermal or radiation energy. Following this, a second coating or size coating is applied over the abrasive particles and the make coating. Both the make coat and the size coat are then fully solidified.

In the preparation of a seamless coated abrasive of the present invention, the backing may be installed around two drum rollers, which are connected to a motor for rotating the backing. Alternatively, the backing may be installed around one drum roller, which is connected to a motor for rotating the backing. As the backing rotates, the make coat is applied by any conventional coating technique such as knife coating, die coating, roll coating, spray coating, or curtain coating. Spray coating is preferred. The abrasive particles are applied after application of the make coat. The abrasive particles can be electrostatically deposited onto the make coat by an electrostatic coater. The drum roller acts as the ground plate for the electrostatic coater. Alternatively, the abrasive particles can be applied by drop coating.

Preferably, the make coat is solidified, or at least partially solidified, prior to application of the size coat. The size coat can be applied by any conventional method, such as roll coating, spray coating, or curtain coating. The size coat is preferably applied by spray coating. The make coat and size coat can then be fully cured while the backing is still on the drum roller(s). Alternatively, the resulting product can be removed from the drum roller(s) prior to cure of the make and size coatings.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Various modifications and alterations of this invention will become apparent to those skilled in the art without departing from the scope and spirit of this invention, and it should be understood that this invention is not to be unduly limited to the illustrative embodiments set forth herein.

Glossary of Materials

PET1NW a spunbonded polyester nonwoven mat approximately 0.127 mm thick weighing approximately 28 g/square meter. Commercially available from the Remay Corporation, Old Hickory, Tenn. under the trade designation "REMAY".

E 743 a MDI prepolymer having diisocyanate functionality, designated Mondur E 743, commercially available from Bayer Corp., Pittsburgh, Pa.

E 744 a MDI prepolymer having diisocyanate functionality, designated Mondur E 744, commercially available from Bayer Corp., Pittsburgh, Pa.

HEA 2-hydroxyethyl acrylate commercially available from Dow Chemical Corp., Midland, Mich.

Eb-8402 an acrylated urethane oligomer designated Ebecryl 8402 commercially available from UCB Chemicals, Atlanta, Ga.

V-813 an isocyanate prepolymer designated Vibrathane 813 commercially available from Uniroyal Chemical Corp., Middlebury, Conn.

CAT a salt complex of methylene dianiline dispersed in a plasticizer designated Caytur 31 commercially available from Uniroyal Chemical Corp., Middlebury, Conn.

E-828 an epoxy resin designated Epon 828 commercially available from Shell Chemical Co., Houston, Tex.

THF-1000 a polyol designated polyTHF-1000 commercially available from BASF, Mount Olive, N.J.

THF-250 a polyol designated polyTHF-250 commercially available from BASF, Mount Olive, N.J.

UVI-6974 photoinitiator for cationic systems designated as UVI-6974 commercially available from Union Carbide, Danbury, Conn.

Uv-783 acrylated urethane oligomer designated Uvithane 783 commercially available from Morton International, Cincinnati, Ohio.

CD-504 ethoxylated nonylphenol acrylate designated as CD504 commercially available from Sartomer Co., Exton, Pa.

SR-256 2-(2-ethoxyethoxy)ethyl acrylate designated as SR-256 commercially available from Sartomer Co., Exton, Pa.

SR -602 highly ethoxylated bisphenol A diacrylate, from Sartomer Co., Exton, PA.

SR -610 polyethyleneglycol 600 diacrylate, also from Sartomer Co., Exton, Pa.

Ph-6173 monofunctional acrylate designated as Photomer 6173 commercially available from Henkel, Ambler, Pa.

I-651 photoinitiator designated as Irgacure 651 commercially available from Ciba Specialty Chemicals Corp., Hawthorne, N.Y.

I-261 photoinitiator designated as Irgacure 261 commercially available from Ciba Specialty Chemicals Corp., Hawthorne, N.Y.

PSOLV solvent blend designated as Polysolv PM containing 15% water and 85% propylene glycol monomethyl ether commercially available from Worum Chemical Co., St. Paul, Minn.

A-100 a solvent, designated as Aromatic 100 commercially available from Worum Chemical Co., St. Paul, Minn.

CMD 55% by wt. diglycidyl ether of bisphenol A epoxy resin in water, commercially available under the trade designation "CMD35201" from Hi-Tek Polymers, Jeffersontown, Ky.

ERC 25% by wt. solution of 2-ethyl-4-methyl imidiazole in water, commercially available under the trade designation "EMI-24" from Air Products, Allentown, Pa.

KRO red iron oxide pigment commercially available under the trade designation "KR-3097" from Harcros Pigments, Inc., E. St. Louis, Ill.

General Procedure 1
Preparing a Seamless Backing

This procedure illustrates the general method of making a backing of a seamless backing utilizing a thermoset binder material as reported in U.S. Pat. No. 5,681,612 (Benedict et al.).

The backing was formed on an aluminum drum having a diameter of 19.4 cm and a circumference of 61 cm. The aluminum drum had a wall thickness of 0.64 cm and was installed on a 7.6 cm mandrel rotated by a DC motor capable of rotating from 1 to 40 revolutions per minute (rpm). Over the periphery of the drum was a 0.13 millimeter thick silicone coated polyester film, which acted as a release surface. This silicon coated polyester film was not part of the backing. The final dimensions of the loop were 61 cm wide by 61 cm long (i.e., 61 cm circumference).

Two layers of nonwoven web (PET1NW) approximately 15 cm wide were saturated with a backing binder precursor by means of a knife coater with a gap set at 0.3 mm. The backing binder precursor comprised by weight 60% V-813, 28.5% CAT, and 1.5% KRO. The backing binder precursor was a 90% by wt. solution in A-100. The resulting saturated material was wrapped twice around the drum as the drum rotated at approximately 5 rpm. Next, six reinforcing fibrous strands were first coated with the backing binder precursor by means of a pump fed needle die, then wrapped over the saturated nonwoven web by means of a yarn guide system with a level winder that moved across the face of the drum at about 20 cm/min. The drum was rotating at 80 rpm. This resulted in a backing with a distinct layer of fibrous strands with a spacing of 24 strands per cm of width. The strands were alternating nylon (210 denier nylon strands commercially available under the trade designation "728DTX" from Dupont, Willmington, Del.) and fiberglass (0.7 oz fiberglass strands commercially available under the trade designation "G150" from PPG, Pittsburgh, Pa.). The dry weight of the backing binder precursor was about 340 g/m$^2$. The strand spacing was changed by the increase or decrease in the rate of rotation of the drum or the increase or decrease in the speed of the yarn guide. The backing binder precursor was then cured while rotating slowly at 10 rpm in an oven at 150° C. for 20 minutes.

General Procedure 2
Preparing a Seamless Backing

This procedure illustrates the general method of the present invention for preparing a seamless backing (i.e., a seamless belt or loop).

The backing was formed on an aluminum drum having a diameter of 19.4 cm and a circumference of 61 cm. The aluminum drum had a wall thickness of 0.64 cm and was installed on a 7.6 cm mandrel rotated by a DC motor capable of rotating from 1 to 40 revolutions per minute (rpm). Over the periphery of the drum was a 0.13 millimeter thick silicone coated polyester film, which acted as a release surface. This silicon coated polyester film was not part of the backing. The final dimensions of the loop were 61 cm wide by 61 cm long (i.e., 61 cm circumference).

Two layers of nonwoven web (PET1NW) approximately 15 cm wide were wrapped twice around the drum as the drum rotated at approximately 5 rpm. Next, six reinforcing fibrous strands were wrapped over the nonwoven web by means of a yarn guide system with a level winder that moved across the face of the drum at about 20 cm/min. The strands were alternating nylon (210 denier nylon strands commercially available under the trade designation "728DTX" from Dupont, Willmington, Del.) and fiberglass (0.7 oz. fiberglass strands commercially available under the trade designation "G150" from PPG, Pittsburgh, Pa). The strands were applied at a spacing of 24 strands per centimeter width.

During the strand winding process, the backing binder precursor was applied over the nonwoven web and fibrous reinforcing strands. The coating head which applied the backing binder precursor moved across the face of the drum with the level winder system (i.e, at a rate of 20 cm/min). The backing binder precursor was supplied to the coating head by a meter and mix system (see, FIG. 4). The meter and mix comprised vessel A, which held the polyisocyanate prepolymer and vessel B, which held a mixture comprising the acrylated urethane, polyol, and polymerization agent(s). The mixtures in vessel A and vessel B were pumped via two Zenith gear pumps through separate lines directly into a motionless mixer which combined the mixtures to form the backing binder precursor. The rate of flow through the gear pumps was controlled to provide the desired stochiometric ratio of polyisocyanate prepolymer and polyol and the desired backing binder precursor coating weight. The backing binder precursor coating weight was about 340 g/m$^2$.

Once applied, the backing binder precursor was cured using an ultraviolet light (Fusion Systems, "D" lamp) operating at 236 watts/cm (600 watts/inch). The ultraviolet light, which had a width of 25.4 cm (10 inches), was positioned over the drum at a distance of about 7.5 cm (2.95 inches). After coating the backing binder precursor onto the fibrous reinforcing materials, the backing binder precursor was exposed to ultraviolet light for a period of 45 seconds while the drum was rotated under the lamp at 3 rev/min. Since the ultraviolet lamp was narrower then the width of the backing (i.e., the lamp was 25.4 cm in width whereas the backing was 55.9 cm in width), the lamp was positioned at a series of 3 locations (25.4 cm apart) which spanned the width of the drum. The lamp remained in each location for a period of 45 seconds. After completion of the ultraviolet exposure, the backing binder precursor was thermally cured for 10 minutes at 121° C. (250° F.).

General Procedure 3
Preparing a Seamless Coated Abrasive Article

This procedure illustrates the general method of making a seamless coated abrasive article from a seamless backing.

First, a seamless backing was installed on the aluminum drum/mandrel assembly as described in "Procedure I for Preparing the Backing." As the drum rotated at 40 rpm, a make coat was applied by an air spray gun to the outer surface of the backing loop. It took between 30 to 40 seconds to spray the make coat onto the backing. The make coat was applied as a 70% by wt. solution in a solvent comprising 10% PSOLV and 90% water. The make coat resin comprised 48% resole phenolic resin and 52% calcium carbonate filler. The make coat was applied at a wet coating weight of about 105 g/m$^2$.

Next, grade 80 abrasive particles were electrostatically coated onto the make coat at a weight of about 377 g/m$^2$. The drum rotated at 10 rpm during the activation of the electric field which coated the abrasive particles into the make coat precursor. The drum acted as the ground plate. The abrasive particles had an average particle size of 300 micrometers (ANSI grade 80) and comprised a 15/85% by wt. blend of fused aluminum oxide and ceramic aluminum oxide (The ceramic aluminum oxide was made according to U.S. Pat. Nos. 4,314,827 and 4,881,951 and is available from Minnesota Mining and Manufacturing Co., St. Paul, Minn. under the trade designation "Cubitron 321"). The abrasive particle blend was performed according to U.S. Pat. No. 4,734,104. After coating, the resulting construction was removed and was placed in a batch oven for 60 minutes at 98° C.

After drying, the drum was mounted on a shaft that rotated at 40 rpm. A size coat precursor was sprayed over the abrasive particles and make coat on the surface of the backing loop. The size coat precursor was a 72% by wt. solution in solvent comprising 90% water and 10% PSOLV. The size coat comprised 32 parts of a resole phenolic resin, 66 parts of cryolite, and 2 parts KRO. The size coat was spray applied at a wet coating weight of about 190 g/m2. After application of the size coat, the resulting construction was removed from the drum and was precured for 60 minutes at 98° C.

After the precure, the seamless coated abrasive article was remounted on the drum. A supersize coating was then applied over the size coat. The supersize was applied as a 72% solids solution in water. The supersize coating comprised 17 parts of CMD, 76 parts potassium tetrafluoroborate grinding aid, 2 parts KRO, and 2 parts ERC. The supersize was applied at a wet coating weight of about 150 g/m$^2$. The resulting construction was first cured for 60 minutes at 98° C. followed by a final cure for 5 hours at 105° C.

Prior to testing, the resulting seamless coated abrasive articles were flexed by running over a 2.5 cm support bar and a raised spiral bar.

Test Procedure 1
Dynafile Grinding Test

A seamless coated abrasive article in the form of a belt (1.3 cm by 61 cm) was installed on a air powered abrasive belt machine (model #11000, from Dynabrade Inc. Clarence, N.Y.). This belt machine had a 1" diameter×⅜" wide (2.54 cm×0.95 cm), rubber contact wheel; model #11219, also available from Dynabrade. A 12" diameter by ⅛" thick (30.5cm×0.3cm) 304 stainless steel disc workpiece was positioned at 90° to the center of the rubber contact wheel and was rotated at 3 rpm. Line pressure of 90 psi (about 6.3 kg/cm$^2$) was used to power the air powered abrasive belt machine. The center of the ½" (1.3 cm) wide belt surface was ground continuously for 2 minutes or until the belt failed. The seamless coated abrasive belt was urged against the workpiece by a 760 g weight. The seamless coated abrasive belt was weighed before and after the test. The disk was also weighed before and after the test. A generally preferred seamless coated abrasive belt construction ground at a high cut rate with a minimal loss in belt weight (i.e., low amounts of shelling). The results listed in Table 1 were an average.

Test Procedure 2
ELB Grinding Test

In order to determine properties in the context of grinding 1018 steel, an ELB Grinding Test was conducted. Seamless coated abrasive articles (i.e., belts) described in the section for Examples 4–5 and Comparative Example E were converted to 102 cm by 2.54 cm strips and attached to the periphery of a 36 cm diameter aluminum contact wheel installed on an ELB reciprocating bed grinding machine available from ELB Grinders Corp., Mountainside, N.J., under the trade designation "ELB Type SPA 2030ND". Wet grinding utilized water as a lubricant.

The effective cutting area of the abrasive article was 1.27 cm (0.5") by 102 cm. The workpiece abraded by the seamless coated abrasive belts was 1018 steel having dimensions of 1.27 cm (width) by 35.6 cm (length) by 10.2 cm (height) for the wet grinding tests. Abrading was conducted along the 1.27 cm by 35.6 cm edge. The 1018 steel workpiece was mounted on a reciprocating table. The speed of the abrasive belt was 5500 surface feet/min (1676 surface meters/min). The table speed, at which the workpiece traversed, was 6 meters per minute. The downfeed increment of the abrasive belt was 0.05 mm/pass of the workpiece. The process used was conventional surface grinding wherein the workpiece was reciprocated beneath the rotating abrasive strip with incremental downfeeding between each pass. The coolant or lubricant was circulated at 6 gallons/min. The seamless coated abrasive belts were ground to a wear out endpoint and the total amount of 1018 steel cut was measured.

Comparative Example A

Comparative Example A was prepared according to General Procedure 1 and General Procedure 3. The backing binder precursor comprised by weight 60% V-813, 28.5% CAT, and 1.5% KRO. The binder precursor was diluted to a 90% by wt. solution using A-100.

Comparative Example A was tested according to Test Procedure 1. Comp. Example A had a cut of 6.5 g and a belt weight loss of 1.0 g.

Comparative Example B & C

These examples show the use of epoxy/polyol chemistry as the backing binder for a seamless backing.

The backings of Comparative Examples B and C were prepared as described in General Procedure 2 except that the backing binder precursor was cured for two minutes under a Fusion Systems "D" lamp operating at 158 watts/cm and was then thermally cured for 5 minutes at 100° C. The backing binder precursor formulations for Comp. Examples B and C are set forth below. The seamless backings were converted into seamless coated abrasive articles as described in General Procedure 3. After curing the abrasive coating, the seamless coated abrasive belts were flexed and slit. During this operation, the abrasive coating delaminated from the backing due to poor adhesion.

| Materials | Comp. Ex. B (g) | Comp. Ex. C (g) |
|---|---|---|
| E-828 | 360 | 420 |
| THF-1000 | 240 | 180 |
| UVI-6974 | 15 | 15 |

Comparative Example D

This example shows the use of UV curable acrylate functional resins in the backing binder of seamless coated abrasive articles.

The backing of Comparative Example D was prepared as described in General Procedure 2 except that the backing binder precursor was cured for 15 seconds under a Fusion Systems "D" lamp operating at 158 watts/cm. There was no thermal cure. The formulation of the backing binder precursor is set forth below. The backing was converted into a seamless coated abrasive article as described in General Procedure 3.

| Materials | Comp. Ex. D (g) |
|---|---|
| UV-783 | 420 |
| CD-504 | 60 |
| SR-256 | 90 |
| Ph-6173 | 30 |
| I-651 | 6 |

The resulting seamless coated abrasive articles were tested according to Test Procedure 1. The cut performance was 4.2 g, and the belt weight loss was 7.3 g. These results show a low cut and an unacceptably high shelling of the abrasive particles.

Examples 1–3

Examples 1–3 illustrate seamless coated abrasive articles of the present invention. The seamless coated abrasive articles of Examples 1–3 were prepared according to General Procedure 2 and General Procedure 3. The specific backing binder precursor formulations for Examples 1–3 are listed below. The resulting seamless coated abrasive articles were tested according to Test Procedure 1 and the results are reported in Table 1.

Backing Binder Precursors for Examples 1–3.

| Materials | Example 1 (g) | Example 2 (g) | Example 3 (g) |
|---|---|---|---|
| Eb-8402 | 25.0 | 25.0 | 20.0 |
| THF-250 | 30.7 | 22.4 | 23.9 |
| E 744 | 44.3 | 35.1 | 37.4 |
| E 743 | — | 17.5 | 18.7 |
| I-651 | 1.0 | 1.0 | 1.0 |

TABLE 1

| Sample | Avg. Cut (g) | Wt. loss (g) |
|---|---|---|
| Comp. Ex. A | 6.0 | 0.76 |
| Example 1 | 7.6 | 1.0 |
| Example 2 | 7.1 | 0.70 |
| Example 3 | 7.1 | 0.68 |

Synthesis of acrylated urethane (AU) To a five liter, 3 necked round bottomed flask equipped with a paddle stirrer, thermometer with temperature controller, heat source and nitrogen purge were added 3150 g of Desmodur E 743 (equivalent weight, 525), 2 g of 2, 6-di-tert-butyl-4-methylphenol (BHT) and 4 drops of stannous octoate. The contents of the reaction were stirred and heated to 50° C. At this point, 230 g (1.98 equivalents) of 2-hydroxyethyl acrylate (HEA) were added. The temperature of the reaction contents rose to approximately 70° C. The reaction contents were allowed to cool to approximately 55° C. Another 230 g (1.98 equivalents) of HEA was added. The temperature of the contents rose to approximately 60° C. When the exotherm had subsided, 240 g (2.06 equivalents) of HEA were added and the temperature of the contents were raised to 65° C. and held for 2 hours. A sample was removed and shown to contain excess isocyanate (NCO) by infrared spectral analysis (IR). An additional 4 drops of stannous octoate were added to the reaction vessel and the contents heated for an additional 4 hours at 65° C. A sample removed for analysis by IR showed no appreciable NCO remaining. At this point, 6 drops of 85% phosphoric acid were added to the reaction contents and stirred for 15 minutes. The clear, viscous, slightly yellow urethane acrylate was drained into a covered glass container.

Comparison of AU with Ebecryl 8402

Acrylated urethane (AU) and Eb-8402 were each formulated with one part I-651 photoinitiator. Coatings of the formulations were spread on unprimed polyester film using a knife coater having a 0.76 mm gap (measured between the polyester film and the knife). The resulting coatings were passed under an ultraviolet light (Fusion Systems lamp operating at 236 watt/cm (600 watt/inch)) at a rate of 9.1 m/min. After one pass, the coating of Eb-8402 was tacky on the surface. The coating of the AU was dry. It was further observed that the AU coating was more flexible than the Eb-8402 coating.

Effect of a Radiation Initiated Urethane Catalyst on the Cure of Backing Binder Precursor Formulations The effect of a radiation initiated urethane catalyst (i.e., I-261) on the cure of backing binder precursor formulations was examined. The formulations tested are listed below in Table 2.

TABLE 2

| Components | Form. 1 (g) | Form. 2 (g) | Form. 3 (g) |
|---|---|---|---|
| E 744 | 34.4 | 34.4 | 34.4 |
| E 743 | 23 | 23 | 23 |
| Eb-8402 | 20 | — | — |
| AU | — | 20 | 20 |
| THF-250 | 22.6 | 22.6 | 22.6 |
| I-651 | 0.8 | 0.8 | 0.8 |
| I-261 | — | — | 0.5 |

Coatings of the backing binder precursor formulations 1–3 were applied to unprimed polyester film using a knife coater having a 0.7 mm gap (measured between the polyester film and the knife). The resulting coatings were passed twice under an ultraviolet light (Fusion Systems lamp operating at 236 watt/cm (600 watt/inch)) at a rate of 9.1 m/min. After two passes under the lamp, the cure of the coatings was evaluated. The coating of formulation 1 was observed to be tacky meaning that cure was incomplete. The coating of Formulation 2 was observed to be very tacky meaning that cure was incomplete. The coating of Formulation 3 was dry and cured.

Examples 4–5

Comparison of AU and Eb-8402 in Seamless Coated Abrasive Articles

The backings of Examples 4–5 were prepared as described in General Procedure 2 with the following modifications. First, a 107 cm drum was used to prepare backings having a length of 107 cm. Second, the backings were cured by exposure to ultraviolet light for 45 seconds while the backing rotated on the drum at a rate of 2 rpm. The ultraviolet cure was followed by a thermal cure for 10 minutes at 122° C. (250° F.). The backing binder precursor of Formulation 1 was used for Example 4. The backing binder precursor of Formulation 2 was used for Example 5.

The backings were converted into seamless coated abrasive articles as described in General Procedure 3, except that no supersize coating was applied. The resulting seamless coated abrasive articles were tested according to Test Procedure 2 and the results are reported in Table 3.

TABLE 3

| Sample | Cut (g) |
|---|---|
| Example 4 | 1,826 |
| Example 5 | 2,654 |
| Comp. Ex. E* | 1,282 |

*Comparative Ex. E was prepared as Comparative Ex. A except that a supersize coating was not applied.

Water Absorption of Abrasive Backings

The following backings were tested for water absorption.

(1) Phenolic/Latex Backing: a backing material of 100% polyester 4/1 sateens fabric made from ring spun yarns, weighing 282 grams per square meter commercially available from Milliken and Co., Spartanburg, S.C., which were treated with a 10% nitrile latex/90% resole phenolic resin, bringing the weight to 356 grams per square meter (dry weight) and was then backsized with a filled resole phenolic resin (40% resole phenolic resin with 60% $CaCO_3$) bringing the weight to 475 grams per square meter. The resulting backing was cured for 10 hours at 100° C.

(2) Backing of Comp. Ex. A: A backing was made as described in Comp. Ex. A except that no abrasive coating was applied to the backing.

(3) Backing of Formulation 3: a backing prepared as described in General Procedure 2 except the backing was formed over a 107 cm drum and was cured by exposure to ultraviolet light for 45 seconds while the backing was rotated on the drum at a rate of 2 rpm. The backing binder precursor of Formulation 3 was used.

The backings were tested as follows. First, 5 by 20 cm abrasive backing samples were weighed and were immersed in tap water for 24 hours. After 24 hours of immersion, the backings were removed, blotted dry, and were reweighed. The amount of water absorbed by each sample was calculated and is expressed below as a percentage of the initial (i.e., dry) weight of the backing.

| Backing | % water absorbed |
|---|---|
| (1) Phenolic/latex | 12.8 |
| (2) Backing of Comp. Ex. A | 9.0 |
| (3) Backing of Form. 3 | 2.1 |

Thermal resistance of Backings

The thermal resistance of seamless backings was tested using a Belton grinder, model #B-20B (available from Nitto-Khoki Ltd., Japan). The test involved continuous grinding of a 304 stainless steel workpiece for 5 minutes while monitoring the platen temperature of the grinder using a thermocouple. The abrasive belts abraded the 1.3×17.8 cm face of the workpiece.

Seamless coated abrasive articles (i.e., belts) were prepared as described in Comp. Ex. A except that the length (i.e., circumference) of the belts was 52 cm and the width of the belts was 1.9 cm. Seamless coated abrasive articles (i.e., belts) of Example 6 were prepared according to General Procedures 2 and 3 except that length of the belts was 52 cm, the width of the belts was 1.9 cm. Further, no thermal cure was given to the belts of Example 6 in General Procedure 2. The belts of Example 6 ran for the entire 5 minutes with the maximum temperature of the platen reaching 165° C. No tackiness of the backing was observed. The belts of Comparative Example A ran for 2 minutes before the backing became sticky and began to mistrack and stick to the platen. The maximum temperature of the platen was 175° C. when the belts became sticky and mistracked.

Comparison of AU to Commercial Diacrylates

Commercially available acrylate monomers were evaluated as the free radically curable portion of the backing binder of a seamless coated abrasive article of the present invention. The backing binder precursor formulations were as follows.

Backing Binder Precursor Formulations for Ex. 6–7 and Comp. Ex. F–I

| Materials | Form. 3 (g) | Form. 4 (g) | Form. 5 (g) |
|---|---|---|---|
| E 744 | 34.4 | 34.4 | 34.4 |
| E 743 | 23 | 23 | 23 |
| AU | 20 | — | — |
| SR 602 | — | 20 | — |

-continued

| Materials | Form. 3 (g) | Form. 4 (g) | Form. 5 (g) |
|---|---|---|---|
| SR 610 | — | — | 20 |
| THF-250 | 22.6 | 22.6 | 22.6 |
| I-651 | 0.8 | 0.8 | 0.8 |
| I-261 | 0.5 | — | — |

Seamless backings having a circumference of 61 cm were prepared as described in General Procedure 2 using backing binder precursor formulations 3, 4 and 5. The backings were not thermally cured in General Procedure 2.

A grade 80 abrasive coating was applied to the samples designated as Ex. 6, Comp. Ex. F and Comp. Ex. G using General Procedure 3. A grade 50 abrasive coating was applied to the samples designated Ex. 7, Comp. Ex. H. and Comp. Ex. I using General Procedure 3, except that the make coating had a weight of 111 g/m$^2$, the mineral coating had a weight of 580 g/m$^2$, the size coating had a size coating of 424 g/m$^2$, and the supersize coating had a weight of 176 g/m$^2$. The resulting abrasive belts were tested according to Test Procedure 1 and the results are reported in Table 5.

TABLE 5

ABRASIVE PERFORMANCE AS FUNCTION OF ACRYLATE

| Sample | Binder Precursor Formulation | grade | total cut (g) | belt loss (g) |
|---|---|---|---|---|
| Example 6 | Form. 3 | 80 | 8.4 | 0.59 |
| Comp. Ex. F | Form. 4 | 80 | 8.8 | 0.49 |
| Comp. Ex. G | Form. 5 | 80 | 8.6 | 3.10 |
| Example 7 | Form. 3 | 50 | 14 | 2.4 |
| Comp. Ex. H | Form. 4 | 50 | 14.2 | 4.3 |
| Comp. Ex. I | Form. 5 | 50 | 10.4 | 5.7 |

The commercial acrylic monomers (i.e., Comp. Ex. F–G) worked fairly well in grade 80, belts the belt loss was too high for many applications.

What is claimed is:

1. A seamless backing having a length, a width, a first and second generally parallel side edges, a first major exterior surface, and a second major interior surface, said backing comprising:
   a backing binder comprising an interpenetrating polymer network formed by the polymerization of a backing binder precursor, the backing binder precursor comprising:
   (i) an aromatic polyisocyanate prepolymer;
   (ii) a polyol curative;
   (iii) an acrylated urethane; and
   (iv) at least one polymerization agent; and
   at least one fibrous reinforcing material engulfed within the backing binder.

2. The seamless backing of claim 1 wherein the fibrous reinforcing material comprises a continuous fibrous strand and a fibrous web.

3. The seamless backing of claim 2 wherein the continuous fibrous strand is polyamide or glass.

4. The seamless backing of claim 2 wherein the fibrous web is a spun bonded polyamide.

5. The seamless backing of claim 1 wherein the aromatic polyisocyanate prepolymer is the reaction product of 4,4'-diphenylmethane diisocyanate and an isocyanate reactive material selected from the group consisting of polyols, polyamines, amine terminated polyols, and mixtures thereof.

6. The seamless backing of claim 5 wherein the aromatic polyisocyanate prepolymer has a molecular weight ranging from about 100 to 1200 grams/mole.

7. The seamless backing of claim 5 wherein the aromatic polyisocyanate prepolymer has a molecular weight ranging from about 200 to 600 grams/mole.

8. The seamless backing of claim 5 wherein the aromatic polyisocyanate prepolymer has a functionality ranging from about 2 to 3.

9. The seamless backing of claim 5 wherein the aromatic polyisocyanate prepolymer has an isocyanate content ranging from about 5% to 25%.

10. The seamless backing of claim 1 wherein the polyol curative has a functionality of 2 or greater.

11. The seamless backing of claim 10 wherein the polyol curative has a functionality ranging from about 2 to 3.

12. The seamless backing of claim 10 wherein the polyol curative has a molecular weight ranging from about 100 to 1000 grams/mole.

13. The seamless backing of claim 10 wherein the polyol curative has a molecular weight ranging from about 200 to 500 grams/mole.

14. The seamless backing of claim 10 wherein the polyol curative is a saturated polyether diol having the molecular formula HO[(CH$_2$)$_4$O]$_n$H.

15. The seamless backing of claim 14 wherein the polyol curative has a molecular weight ranging from about 225 to 275 grams/mole.

16. The seamless backing of claim 10 wherein the polyol curative has primary hydroxyl groups.

17. The seamless backing of claim 1 wherein the acrylated urethane is formed by reacting 2-hydroxyethyl acrylate with an aromatic polyisocyanate prepolymer.

18. The seamless backing of claim 1 wherein the acrylated urethane has a functionality ranging from about 2 to 2.2.

19. The seamless backing of claim 1 wherein the acrylated urethane has a functionality of 2.

20. The seamless backing of claim 1 wherein the acrylated urethane has a molecular weight ranging from about 500 to 1500 grams/mole.

21. The seamless backing of claim 1 wherein the acrylated urethane has a molecular weight ranging from about 700 to 1300 grams/mole.

22. The seamless backing of claim 1 wherein the acrylated urethane has less than about 0.1% residual urethane catalyst.

23. The seamless backing of claim 1 wherein the polymerization agent comprises a photoinitiator, a radiation activated urethane catalyst, or a mixture thereof.

24. The seamless backing of claim 23 wherein the radiation activated urethane catalyst is ($\eta^6$-cumene)($\eta^5$-cyclopentadienyl)-iron(II) hexafluorophosphate.

25. The seamless backing of claim 23 wherein the photoinitiator comprises from about 0.1 to 5% by wt. of the binder precursor.

26. The seamless backing of claim 23 wherein the radiation activated urethane catalyst comprises from about 0.1 to 1% by wt. of the binder precursor.

27. The seamless backing of claim 1 wherein the aromatic polyisocyanate prepolymer and the polyol curative comprise about 60 to 90% by wt. of the binder precursor.

28. The seamless backing of claim 1 wherein the acrylated urethane comprises about 10 to 40% by wt. of the binder precursor.

29. The seamless backing of claim 1 further comprising an abrasive coating comprising a plurality of abrasive particles adhered to the first major exterior surface of the seamless backing by a make coat and a size coat.

30. A seamless coated abrasive article comprising:
(a) a seamless backing having a length, a width, a first and second generally parallel side edges, a first major exterior surface, and a second major interior surface, said backing comprising:
   a backing binder comprising an interpenetrating polymer network formed by the polymerization of a backing binder precursor, the backing binder precursor comprising:
      (i) an aromatic polyisocyanate prepolymer;
      (ii) a polyol curative;
      (iii) an acrylated urethane; and
      (iv) at least one polymerization agent;
   at least one fibrous reinforcing material engulfed within the backing binder; and
(b) an abrasive coating comprising a plurality of abrasive particles adhered to the first major exterior surface of the seamless backing by a make coat and a size coat.

31. The seamless coated abrasive article of claim 30 wherein the make coat is a phenolic resin, an aminoplast resin, a urethane resin, an epoxy resin, an isocyanate resin, an acrylated urethane resin, an acrylate epoxy resin, or a mixture thereof.

32. The seamless coated abrasive article of claim 30 wherein the size coat is a phenolic resin, an amnioplast resin, a urethane resin, an epoxy resin, an isocyanate resin, an acrylated urethane resin, an acrylate epoxy resin, or a mixture thereof.

33. The seamless coated abrasive article of claim 30 wherein the abrasive particles are selected from the group consisting of fused aluminum oxide, heat treated aluminum oxide, ceramic aluminum oxide, silicon carbide, alumina zirconia, garnet, diamond, cubic boron nitride, and mixtures thereof.

34. The seamless coated abrasive article of claim 30 wherein the fibrous reinforcing material comprises a continuous fibrous strand and a fibrous web.

35. The seamless coated abrasive article of claim 30 wherein the aromatic polyisocyanate prepolymer is the reaction product of 4,4'-diphenylmethane diisocyanate and a polyether polyol.

36. The seamless coated abrasive article of claim 30 wherein the aromatic polyisocyanate prepolymer has a functionality ranging from about 2 to 3.

37. The seamless coated abrasive article of claim 30 wherein the polyol curative is a saturated polyether diol having the molecular formula $HO[(CH_2)_4O]_nH$.

38. The seamless coated abrasive article of claim 30 wherein the acrylated urethane is formed by reacting 2-hydroxyethyl acrylate with an aromatic polyisocyanate prepolymer.

39. The seamless coated abrasive article of claim 30 wherein the acrylated urethane has a functionality ranging from about 2 to 2.2.

40. The seamless coated abrasive article of claim 30 wherein the polymerization agent comprises a photoinitiator and a radiation activated urethane catalyst.

41. The seamless coated abrasive article of claim 30 wherein the aromatic polyisocyanate prepolymer and the polyol curative comprise about 60 to 90% by wt. of the binder precursor and wherein the acrylated urethane comprises about 10 to 40% by wt. of the binder precursor.

42. A seamless backing having a length, a width, a first and second generally parallel side edges, a first major exterior surface, and a second major interior surface, said backing comprising:
   a backing binder comprising an interpenetrating polymer network formed by the polymerization of a backing binder precursor, the backing binder precursor comprising:
      (i) an aromatic polyisocyanate prepolymer;
      (ii) a polyol curative;
      (iii) an acrylated urethane having less than about 0.01% wt. residual urethane catalyst; and
      (iv) a polymerization agent comprising a photoinitiator and a radiation initiated urethane catalyst.
   at least one fibrous reinforcing material engulfed within the backing binder.

* * * * *

UNITED STATES PATENT AND TRADEMARK OFFICE
CERTIFICATE OF CORRECTION

PATENT NO. : 6,465,076 B2
DATED : October 15, 2002
INVENTOR(S) : Larson, Eric G.

It is certified that error appears in the above-identified patent and that said Letters Patent is hereby corrected as shown below:

<u>Title page,</u>
After last cited FOREIGN PATENT DOCUMENT, insert

OTHER PUBLICATIONS
"Ineterpenetrating polymer network (IPN) materials"; H.L. Frisch, Y. Du, and M. Schulz; - <u>Polymer Networks Principles of their Formation, Structure and Properties</u>; 1$^{st}$ Edition, 1998. --.

<u>Column 14,</u>
Line 25, delete "such" and insert in place thereof -- Such --.

<u>Column 29,</u>
Line 15, delete "0.7mm" and insert in place thereof -- 0.76 mm --.

Signed and Sealed this

Second Day of September, 2003

JAMES E. ROGAN
*Director of the United States Patent and Trademark Office*